(12) United States Patent
Ahn et al.

(10) Patent No.: US 10,588,149 B2
(45) Date of Patent: Mar. 10, 2020

(54) WIRELESS COMMUNICATION METHOD AND WIRELESS COMMUNICATION TERMINAL

(71) Applicant: WILUS INSTITUTE OF STANDARDS AND TECHNOLOGY INC., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/520,808

(22) PCT Filed: Oct. 20, 2015

(86) PCT No.: PCT/KR2015/011092
§ 371 (c)(1),
(2) Date: Apr. 20, 2017

(87) PCT Pub. No.: WO2016/064168
PCT Pub. Date: Apr. 28, 2016

(65) Prior Publication Data
US 2018/0020481 A1    Jan. 18, 2018

(30) Foreign Application Priority Data

Oct. 22, 2014 (KR) ........................ 10-2014-0143125
Mar. 13, 2015 (KR) ........................ 10-2015-0035127

(51) Int. Cl.
*H04W 74/08* (2009.01)
*H04W 72/04* (2009.01)

(52) U.S. Cl.
CPC ... *H04W 74/0816* (2013.01); *H04W 72/0453* (2013.01)

(58) Field of Classification Search
CPC .................................................. H04W 74/0816
See application file for complete search history.

(56) References Cited

U.S. PATENT DOCUMENTS 7,523,205 B1 * 4/2009 Sherman ........... H04W 74/0808
                                                        370/462
7,957,362 B2 * 6/2011 Xhafa ............... H04W 74/0816
                                                        370/328

(Continued)

FOREIGN PATENT DOCUMENTS

KR    10-2014-0066261    5/2014

OTHER PUBLICATIONS

International Search Report for PCT/KR2015/011092 dated Mar. 31, 2016 and its English translation from WIPO.

(Continued)

*Primary Examiner* — Parth Patel
(74) *Attorney, Agent, or Firm* — Ladas & Parry, LLP

(57) ABSTRACT

Provided is a wireless communication terminal. The wireless communication terminal includes a transceiver configured to transmit/receive a wireless signal and a processor configured to control an operation of the wireless communication terminal. The transceiver receives a MAC frame including information on a plurality of wireless communication terminals that are to receive data from a base wireless communication terminal. The plurality of wireless communication terminals include the wireless communication terminal and receive data from the base wireless communication terminal based on the MAC frame.

15 Claims, 21 Drawing Sheets

(56) References Cited

U.S. PATENT DOCUMENTS

| | | | |
|---|---|---|---|
| 8,467,345 B2 | 6/2013 | Abraham et al. | |
| 8,811,420 B2* | 8/2014 | Singh | H04W 84/18 370/338 |
| 8,913,599 B2* | 12/2014 | Gonikberg | H04W 28/10 370/329 |
| 8,917,743 B2* | 12/2014 | Zhu | H04W 72/042 370/445 |
| 8,937,912 B2* | 1/2015 | Mazet | H04W 74/0816 370/329 |
| 8,953,578 B2* | 2/2015 | Zhu | H04W 74/0816 370/349 |
| 8,982,751 B2* | 3/2015 | Morioka | H04W 74/0816 370/252 |
| 9,131,395 B2* | 9/2015 | Amini | H04W 24/04 |
| 9,210,719 B2* | 12/2015 | Habetha | H04W 74/02 |
| 9,661,647 B2* | 5/2017 | Liu | H04W 72/121 |
| 9,794,949 B2* | 10/2017 | Bhargava | H04W 72/085 |
| 9,860,908 B2* | 1/2018 | Wang | H04W 72/121 |
| 2005/0063330 A1 | 3/2005 | Lee et al. | |
| 2007/0036097 A1 | 2/2007 | Costa et al. | |
| 2007/0147322 A1* | 6/2007 | Agrawal | H04W 52/325 370/338 |
| 2010/0046453 A1* | 2/2010 | Jones, IV | H04W 72/0406 370/329 |
| 2010/0085933 A1 | 4/2010 | Ho et al. | |
| 2010/0177757 A1* | 7/2010 | Kim | H04W 74/0816 370/338 |
| 2010/0232380 A1 | 9/2010 | Choi et al. | |
| 2010/0284393 A1* | 11/2010 | Abraham | H04L 5/0023 370/343 |
| 2010/0309871 A1* | 12/2010 | Fischer | H04L 5/0023 370/329 |
| 2011/0103323 A1 | 5/2011 | Wang et al. | |
| 2011/0149918 A1* | 6/2011 | Gong | H04W 72/005 370/336 |
| 2011/0188482 A1* | 8/2011 | Vermani | H04L 27/0012 370/338 |
| 2011/0235576 A1* | 9/2011 | Gong | H04W 74/0816 370/328 |
| 2012/0044925 A1* | 2/2012 | Lee | H04L 27/2602 370/338 |
| 2012/0077510 A1* | 3/2012 | Chen | H04W 28/26 455/452.1 |
| 2012/0134324 A1* | 5/2012 | Chu | H04W 74/0816 370/329 |
| 2012/0147804 A1* | 6/2012 | Hedayat | H04W 74/0816 370/312 |
| 2012/0163483 A1* | 6/2012 | Stacey | H04B 7/0452 375/260 |
| 2012/0218983 A1* | 8/2012 | Noh | H04B 7/0452 370/338 |
| 2012/0307696 A1* | 12/2012 | Morioka | H04W 74/085 370/310 |
| 2012/0327870 A1 | 12/2012 | Grandhi et al. | |
| 2013/0170427 A1* | 7/2013 | Gong | H04B 7/0408 370/312 |
| 2013/0201857 A1* | 8/2013 | Bhargava | H04K 3/222 370/252 |
| 2013/0229996 A1* | 9/2013 | Wang | H04W 72/0413 370/329 |
| 2013/0286959 A1 | 10/2013 | Lou et al. | |
| 2014/0050173 A1* | 2/2014 | Yang | H04W 28/20 370/329 |
| 2014/0086200 A1* | 3/2014 | Seok | H04W 72/02 370/330 |
| 2014/0341135 A1* | 11/2014 | Bhushan | H04W 28/0289 370/329 |
| 2015/0146678 A1* | 5/2015 | Kondylis | H04L 5/0073 370/330 |
| 2015/0156712 A1* | 6/2015 | Choi | H04W 48/20 370/329 |
| 2015/0172012 A1* | 6/2015 | Abeysekera | H04J 1/00 370/329 |
| 2015/0358067 A1 | 12/2015 | Zhang et al. | |
| 2016/0006554 A1* | 1/2016 | Wang | H04L 5/0073 370/329 |
| 2016/0182167 A1* | 6/2016 | Fischer | H04H 20/16 370/312 |
| 2016/0295612 A1 | 10/2016 | Li et al. | |
| 2017/0048879 A1* | 2/2017 | Zhang | H04W 72/12 |
| 2017/0105232 A1* | 4/2017 | Morioka | H04W 74/0816 |
| 2017/0195991 A1* | 7/2017 | Ahn | H04W 72/005 |
| 2017/0231009 A1* | 8/2017 | Wang | H04W 74/0816 |
| 2017/0338935 A1* | 11/2017 | Ahn | H04L 5/0064 |
| 2018/0014311 A1* | 1/2018 | Bhargava | H04W 72/085 |

OTHER PUBLICATIONS

Written Opinion of the International Searching Authority for PCT/KR2015/011092 dated Mar. 31, 2016 and its English machine translation by Google Translate.

International Preliminary Report on Patentability (Chapter I) for PCT/KR2015/011092 dated Apr. 25, 2017 and its English translation from WIPO.

Non-Final Office Action dated Jun. 26, 2018 for U.S. Appl. No. 15/502,202.

Notice of Allowance dated Jan. 3, 2019 for U.S. Appl. No. 15/502,202.

Non-Final Office Action dated Oct. 2, 2019 for U.S. Appl. No. 16/374,017.

\* cited by examiner

FIG. 23

| Bandwidth (Optional) | STBC | Group ID (MU-MIMO) | Number of space-time streams | Coding (optional) | LDCP extra symbol (optional) | MCS |
|---|---|---|---|---|---|---|

*FIG. 24*

WIRELESS COMMUNICATION METHOD AND WIRELESS COMMUNICATION TERMINAL

CROSS-REFERENCE TO RELATED APPLICATIONS

This application is the U.S. National Stage of International Patent Application No. PCT/KR2015/011092 filed on Oct. 20, 2015, which claims the priority to Korean Patent Application No. 10-2014-0143125 filed in the Korean Intellectual Property Office on Oct. 22, 2014 and Korean Patent Application No. 10-2015-0035127 filed in the Korean Intellectual Property Office on Mar. 13, 2015, the entire contents of which are incorporated herein by reference.

TECHNICAL FIELD

The present invention relates to a wireless communication method and a wireless communication terminal for setting a broadband link. More specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

Especially, as the number of devices using a wireless LAN increases, it is necessary to efficiently use a predetermined channel. Therefore, required is a technology capable of efficiently using bandwidths by simultaneously transmitting data between a plurality of stations and APs.

DISCLOSURE

Technical Problem

An object of the present invention is to provide an efficient wireless communication method and wireless communication terminal.

Another object of the present invention is to provide a wireless communication method in which one wireless communication terminal transmits data to a plurality of wireless communication terminals simultaneously and a wireless communication terminal.

Technical Solution

According to an embodiment of the present invention, a wireless communication terminal receives a MAC frame including information on a plurality of wireless communication terminals that are to receive data from a base wireless communication terminal, and the plurality of wireless communication terminals include the wireless communication terminal and receive data from the base wireless communication terminal based on the MAC frame.

At this time, the base wireless terminal may be any one wireless communication terminal different from the plurality of wireless communication terminals.

At this time, the transceiver may obtain a signaling field for signaling a signal including data transmitted to the plurality of wireless communication terminals from a physical frame including data transmitted to the plurality of wireless communication terminals and obtain information on a frequency band allocated to the wireless communication terminal from the signaling field.

At this time, the signaling field may include a plurality of fields, and each of the plurality of fields may indicate a set of information on a frequency band allocated to each of the plurality of wireless communication terminals.

At this time, the transceiver may decode a field indicating a set of information on a frequency band allocated to the wireless communication terminal, and stop decoding the plurality of fields.

In addition, the information on the frequency band may include bandwidth information indicating a bandwidth of the frequency band allocated to the wireless communication terminal and Modulation & Coding Scheme (MCS) information indicating an MCS of a signal including data transmitted to the wireless communication terminal.

In addition, the wireless communication terminal may further include group identifier information for identifying a group of wireless communication terminals including the wireless communication terminal corresponding to information signaled by the signaling field and stream number information indicating a space-time stream number transmitted through the frequency band allocated to the wireless communication terminal.

In addition, the signaling field may include at least one of space-time block coding (STBC) information indicating whether STBC is applied to a signal including data transmitted to the wireless communication terminal, convolution coding information indicating whether convolution coding is applied to a signal including data transmitted to the wireless communication terminal, and extra symbol information indicating whether an extra Orthogonal Frequency Division Multiplexing (OFDM) symbol is required by applying low-density parity-check code (LDPC) coding is applied to a signal including data transmitted to the wireless communication terminal.

In addition, the information on the frequency band may include a channel index indicating a channel including the frequency band and a sub-channel index indicating a sub-channel of the channel.

In addition, the information on the plurality of wireless communication terminals may include an identifier for identifying each of the plurality of wireless communication terminals.

At this time, the information on the plurality of wireless communication terminals may include information on a frequency band allocated to the wireless communication terminal.

At this time, the wireless communication terminal may further include a channel index indicating a channel including the frequency band and a sub-channel index indicating a sub-channel including the frequency band, wherein the sub-channel is a sub-channel of the channel.

According to an embodiment of the present invention, a base wireless communication terminal includes: a transceiver configured to transmit/receive a wireless signal; and a processor configured to control an operation of the base wireless communication terminal, wherein the transceiver transmits a MAC frame including information on a plurality of wireless communication terminals that are to transmit data to the plurality of wireless communication terminals.

At this time, the base wireless terminal may be any one wireless communication terminal different from the plurality of wireless communication terminals.

At this time, the transceiver may transmit a physical frame including data and a signaling field to be transmitted to each of the plurality of wireless communication terminals and the signaling field may signal a signal including the data.

At this time, wherein the signaling field may include a plurality of fields, and each of the plurality of fields may include a plurality of fields indicating a set of information on a frequency band allocated to each of the plurality of wireless communication terminals.

In addition, the information on the frequency band may include bandwidth information indicating a bandwidth of the frequency band allocated to the wireless communication terminal and Modulation & Coding Scheme (MCS) information indicating an MCS of a signal including data transmitted to each of the plurality of wireless communication terminals.

In addition, the information on the frequency band may include a channel index indicating a channel including the frequency band and a sub-channel index indicating a sub-channel including the frequency band, and the sub-channel may be a sub-channel of the channel.

In addition, the information on the plurality of wireless communication terminals may include an identifier for identifying each of the plurality of wireless communication terminals.

In addition, the transceiver may transmit a MAC frame for setting a Network Allocation Vector (NAV) of the plurality of wireless communication terminals before transmitting the MAC frame.

In addition, the transceiver may transmit a MAC frame for setting a Network Allocation Vector (NAV) of the plurality of wireless communication terminals after transmitting the MAC frame.

According to an embodiment of the present invention, an operating method of a wireless communication terminal includes receiving a MAC frame including information on a plurality of wireless communication terminals that are to receive data from a base wireless communication terminal from the base wireless communication terminal, wherein the plurality of wireless communication terminals include the wireless communication terminal; and receiving data from the base wireless communication terminal based on the MAC frame.

At this time, the base wireless terminal may be any one wireless communication terminal different from the plurality of wireless communication terminals.

An embodiment of the present invention provides an efficient wireless communication method and wireless communication terminal.

Especially, an embodiment of the present invention provides a wireless communication method and a wireless communication terminal in which any one wireless communication terminal simultaneously transmits data to a plurality of wireless communication terminals.

Advantageous Effects

One embodiment of the present invention provides an efficient wireless communication method and wireless communication terminal.

Especially, one embodiment of the present invention provides a wireless communication method in which one wireless communication terminal transmits data to a plurality of wireless communication terminals simultaneously and a wireless communication terminal.

DESCRIPTION OF DRAWINGS

FIG. 23 is a view illustrating a physical frame according to an embodiment of the present invention.

FIG. 24 is a view illustrating a signaling field in a physical frame according to an embodiment of the present invention.

MODE FOR CARRYING OUT THE INVENTION

Figure 1:
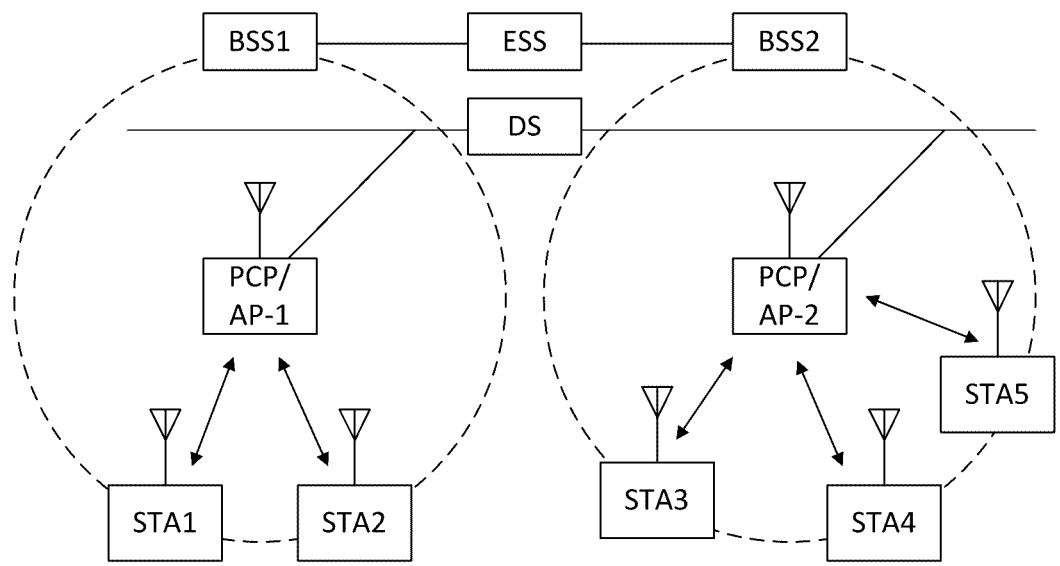
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-0143125 and Nos. 10-2015-0035127 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
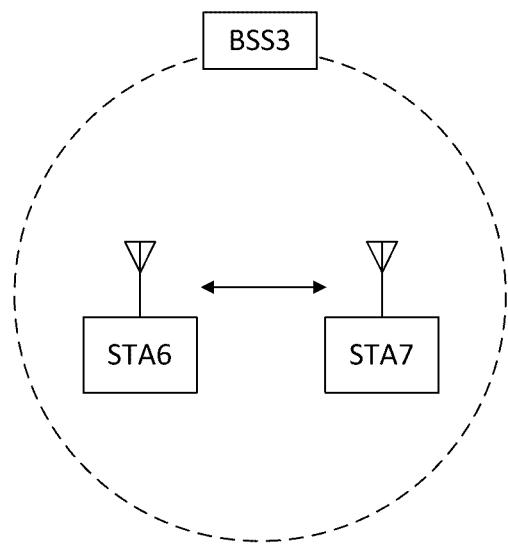
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
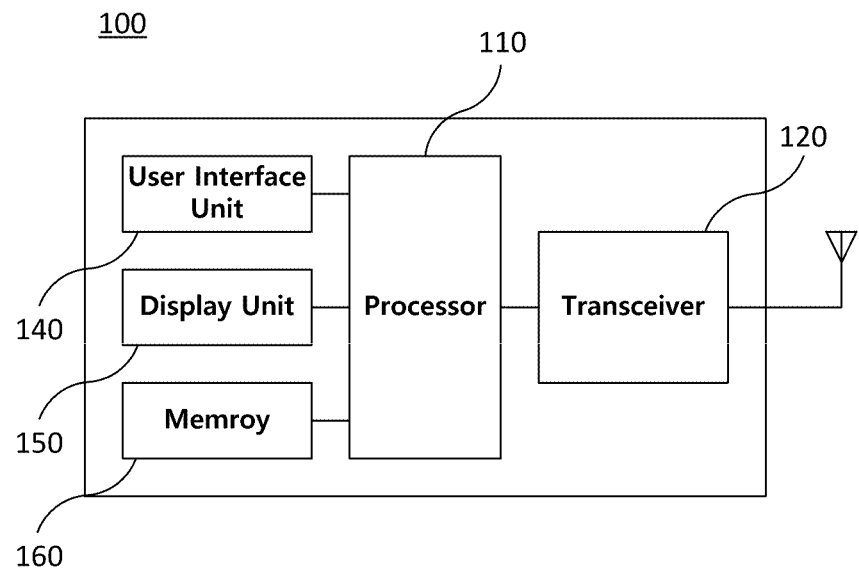
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
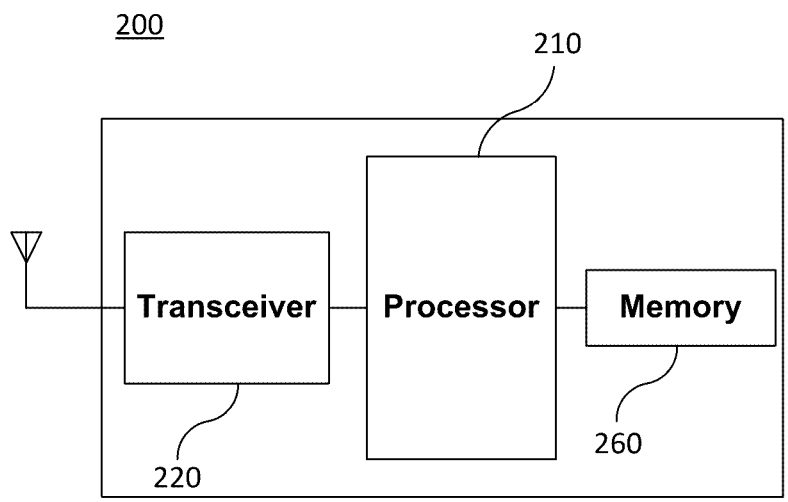
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
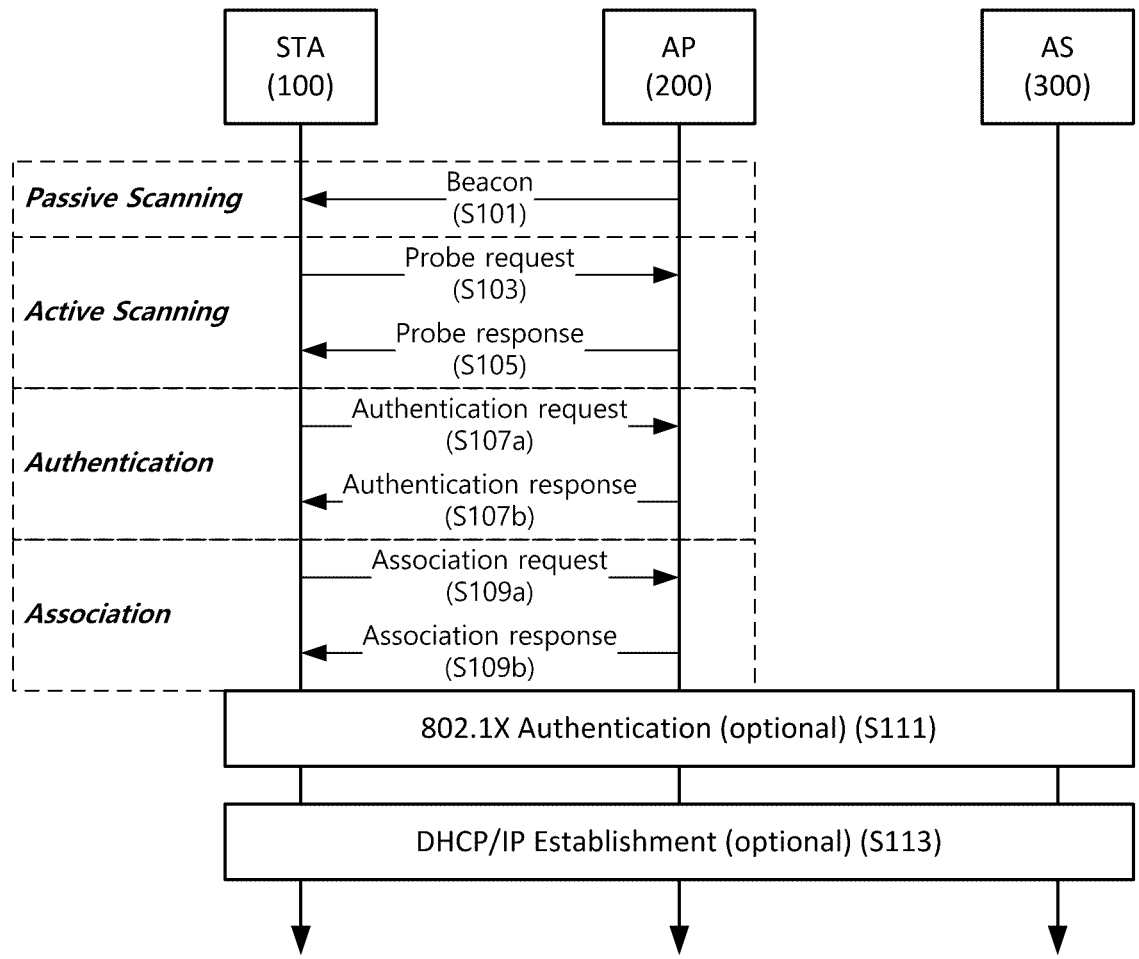
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals. An embodiment of the present invention in which any one wireless communication terminal transmits data to a plurality of wireless communication terminals will be described with reference to drawings after FIG. 6. Especially, a case where any one wireless communication terminal transmits information on data transmission to a plurality of wireless communication terminals will be described with reference to drawings after FIG. 6.

At this time, any one wireless communication terminals may allocate a sub-channel to each of the plurality of wireless communication terminals. The sub-channel is a sub-frequency band included in a channel having a minimum unit frequency bandwidth used by any one wireless communication terminal. Also, the minimum unit frequency bandwidth indicates the size of the smallest frequency band used by the first wireless communication terminal. In a specific embodiment, the minimum unit frequency bandwidth may be 20 MHz.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal. In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

When the first wireless communication terminal transmits data to a plurality of second wireless communication terminals using OFDMA, the first wireless communication terminal allocates a sub-frequency band to each of the plurality of second wireless communication terminals. Then, the first wireless communication terminal may transmit data through a sub-frequency band allocated to each of the plurality of second wireless communication terminals. Accordingly, the first wireless communication terminal should notify the plurality of second wireless communication terminals that data is to be transmitted first. Then, the second wireless communication terminal should signal the sub-frequency band allocated to each of the plurality of second wireless communication terminals to the plurality of second wireless communication terminals. Specifically, the first wireless communication terminal may transmit a MAC frame including information on a plurality of second wireless communication terminals that are to receive data to the plurality of second wireless communication terminals. At this time, the information on the plurality of second wireless communication terminals may include an identifier for identifying the plurality of second wireless communication terminals that are to receive data. In addition, the information on the plurality of second wireless communication terminals may include information on a frequency band allocated to each of the plurality of second wireless communication terminals. The second wireless communication terminal receives data through the allocated frequency band. Further, the second wireless communication terminal may transmit a transmission completion frame indicating transmission completion. Also, the second wireless communication terminal may transmit data to the first wireless communication terminal through the allocated frequency band. According to a specific embodiment, a frame including information on a plurality of second wireless communication terminals may serve as a role of the second wireless communication terminal to trigger data transmission to the first wireless communication terminal of the second wireless communication terminal. For convenience of description, a frame including information on a plurality of second wireless communication terminals is referred to as a poll frame.

The Poll frame will be described in detail with reference to FIGS. 6 to 8.

Figure 6:
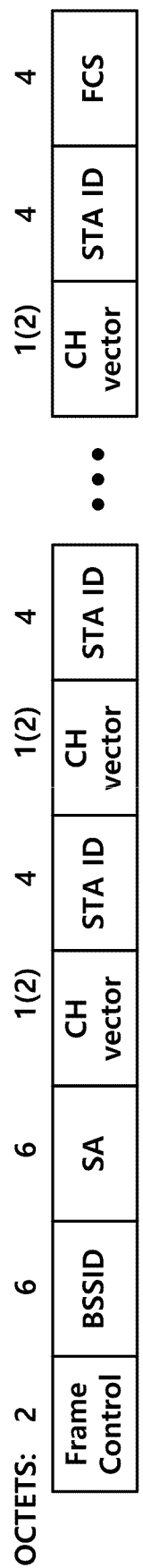
FIG. 6 is a view illustrating a structure of a poll frame according to an embodiment of the present invention.

FIG. 6 is a view illustrating a structure of a poll frame according to an embodiment of the present invention.

The poll frame may include a Basic Service Set Identifier (BSSID) for identifying a basic service set in which the poll frame is transmitted. At this time, the BSSID may indicate the MAC address of the first wireless communication terminal transmitting the poll frame.

The poll frame may include source address information indicating the address of the first wireless communication terminal transmitting the poll frame. At this time, the address of the first wireless communication terminal may be the MAC address of the first wireless communication terminal. The BSSID and the source address information may be identically used as information indicating the first wireless communication terminal. Accordingly, according to a specific embodiment, the poll frame may include any one of the BSSID and the source address information.

The poll frame may include length information indicating the length of the poll frame. The second wireless communication terminal may obtain the number of the second wireless communication terminals participating in the data transmission based on the length information. Specifically, the second wireless communication terminal obtains a variable length by subtracting the length of the field of the fixed poll frame from the length of the poll frame indicated by the length information regardless of the number of the second wireless communication terminals participating in the data transmission. Then, the second wireless communication terminal may divide the obtained variable length by the length of the variable field required for one second wireless communication terminal, thereby obtaining the number of the second wireless communication terminals participating in the data transmission.

The poll frame may include channel vector information indicating information of a frequency channel allocated to the second wireless communication terminal. The channel vector information may include a frequency channel allocated to the second wireless communication terminal.

The poll frame may include information for identifying a plurality of second wireless communication terminals that are to receive data transmitted by the first wireless communication terminal. Specifically, the poll frame may include an identifier for identifying each of a plurality of second wireless communication terminals that are to receive data transmitted by the first wireless communication terminal. At this time, the identifier may be an Association Identifier (AID) for identifying an association between the first wireless communication terminal and the second wireless communication terminal.

The second wireless communication terminal may recognize the channel allocated to the second wireless communication terminal based on the channel vector information and the information for identifying a plurality of second wireless communication, and receive data from the first wireless communication terminal through the corresponding channel. In addition, the second wireless communication terminal may recognize the channel allocated to the second wireless communication terminal based on the channel vector information, and transmit data to the first wireless communication terminal through the corresponding channel. A specific format of channel vector information will be described later with reference to FIGS. 9 to 18.

In a specific embodiment, the poll frame may have the same structure as that of the embodiment of FIG. 6. Specifically, the poll frame may include a frame control field indicating the control information of a frame. The poll frame may include a BSSID field indicating a BSSID. The poll frame may include a source address (SA) field indicating source address information. The poll frame may include a length field indicating length information. The poll frame may include a CH vector field indicating channel vector information. The poll frame may include an STA ID field indicating the address of the second wireless communication terminal that is to receive data transmitted by the first wireless communication terminal. At this time, the STA ID field may be located immediately before or immediately after the CH vector field. Specifically, the STA ID field may be located immediately before or immediately after the CH vector field indicating the frequency band allocated by the second wireless communication terminal indicated by the STA ID field.

The poll frame may include an FCS field including a cyclical redundancy check (CRC) value for error detection.

Figure 7:
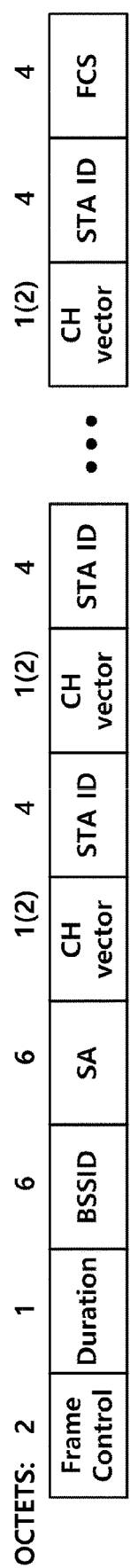
FIG. 7 is a view illustrating a structure of a poll frame according to another embodiment of the present invention.

FIG. 7 is a view illustrating a structure of a poll frame according to another embodiment of the present invention.

The poll frame may include duration information indicating a time required for data transmission after poll frame transmission. Through this, it is possible to prevent other wireless communication terminals from accessing a frequency channel used for data transmission before data transmission is terminated.

In addition, the poll frame may include information indicating the number of second wireless communication terminals to which the poll frame allocates a frequency channel.

In a specific embodiment, the poll frame may have the same structure as that of the embodiment of FIG. 7. Specifically, the poll frame may include a duration field indicating duration information. Also, depending on a specific situation, the duration field may indicate the number of second wireless communication terminals to which the poll frame allocates a frequency channel. Also, depending on a specific situation, the duration field may indicate length information of the poll frame.

As described above, when a first wireless communication terminal and a plurality of second wireless communication terminals communicate using the OFDMA, it is necessary to signal the plurality of second wireless communication terminals of channel information allocated to each of the plurality of second wireless communication terminals. For this, the poll frame may include channel vector information indicating information of a frequency channel allocated to the second wireless communication terminal. Such channel vector information may be used to indicate information of a channel allocated to the second wireless communication terminal even in a MAC frame other than a poll frame or the preamble of a signal including a poll frame. At this time, a MAC frame other than a poll frame may be a data frame including data. Specifically, the header of a physical frame may include channel vector information. In such a case, the second wireless communication terminal may decode the header of a physical frame and obtain information on a frequency band allocated to the second wireless communication terminal. Accordingly, the second wireless communication terminal may quickly obtain information on a frequency band allocated to the second wireless communication terminal.

An embodiment in which the specific format of channel vector information and the channel vector information are used will be described with reference to FIGS. 8 to 18.

Figure 8:
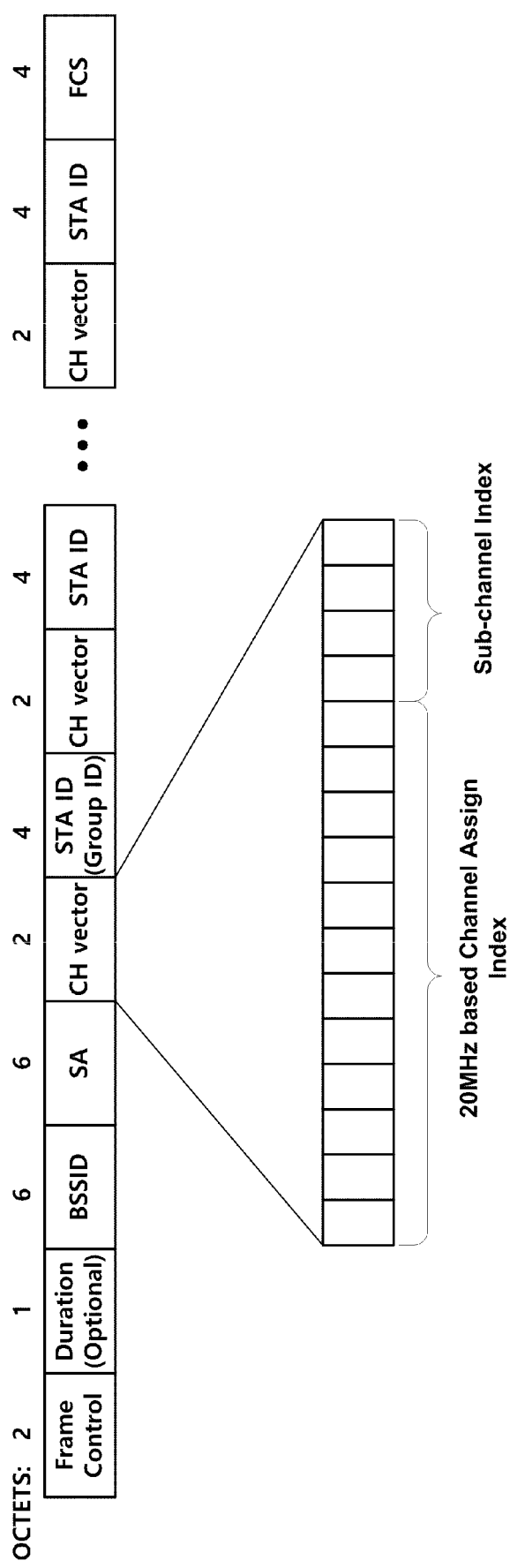
FIG. 8 is a view illustrating a structure of a CH vector field in a poll frame according to an embodiment of the present invention.

FIG. 8 is a view illustrating a structure of a CH vector field in a poll frame according to an embodiment of the present invention.

As OFDMA transmission becomes possible, a plurality of second wireless communication terminals according to an embodiment of the present invention may divide a frequency band having the minimum unit frequency bandwidth into a plurality of frequency bands. At this time, the minimum unit frequency bandwidth represents a minimum bandwidth used by the first wireless communication terminal. Then, each of the plurality of second wireless communication terminals may communicate with the first wireless communication terminal at the same time using each of the plurality of divided frequency bands. At this time, the minimum unit frequency bandwidth may be 20 MHz. Therefore, the channel vector information may include sub-channel information as well as channel information. At this time, the channel information is information on a channel having a bandwidth greater than the minimum unit frequency bandwidth. The sub-channel information, as a sub-band included in a channel, is information on a sub-channel having a bandwidth less than the minimum unit frequency bandwidth.

In a specific embodiment, a channel usage pattern available for the first wireless communication terminal and the second wireless communication terminal may be predefined. In this case, a channel other than the predetermined channel usage pattern may not be used. At this time, the channel usage pattern may indicate whether the range of a frequency band and the frequency band are combined. Such a channel usage pattern may be set for various regulations and technical feasibility. Also, such a channel usage pattern may be represented by an index.

Therefore, the channel vector information may include index information indicating a channel usage pattern. Specifically, the channel vector information may include channel index information. And the channel vector information may include sub-channel index information indicating a sub-channel.

In addition, in order to prevent the size of a poll frame from becoming large as the size of the channel vector information becomes too large, the channel vector information may include channel allocation information on a predetermined number of the second wireless communication terminals. Specifically, when it is necessary to transmit channel allocation information to second wireless communication terminals of more than a predetermined number, the first wireless communication terminal may divide channel allocation information for the plurality of second wireless communication terminals into a plurality of poll frames and transmit them.

In addition, in order to prevent the size of a poll frame from becoming large as the size of the channel vector information becomes too large, the channel vector information may include channel information by a second wireless communication terminal group unit including a plurality of second wireless communication terminals instead of a second wireless communication terminal unit. At this time, the group of the second wireless communication terminals is a set including the plurality of second wireless communication terminals. Specifically, the channel vector information may include a group identifier for identifying the group of second wireless communication terminals and channel information allocated to the group of the second wireless communication terminal. At this time, the first wireless communication terminal may manage the group identifier. Specifically, the first wireless communication terminal may allocate a group identifier to a plurality of second wireless communication terminals in an association or a re-association process. At this time, the first wireless communication terminal may allocate a reserve group identifier remaining for future use to the second wireless communication terminal. In addition, the maximum number of group identifiers that the first wireless communication terminal allocates may be limited to a predetermined number. When the channel vector information includes channel allocation information by each group unit of the second wireless communication terminal, the first wireless communication terminal may signal channel information allocated to each second wireless communication terminal included in a group through the channel vector information in the preamble of data.

In addition, when the same sub-channel is allocated to a plurality of second wireless communication terminals, the poll frame may include a group identifier for identifying the group of the second wireless communication terminals instead of the identifier for identifying the second wireless communication terminal. Specifically, when MU-MIMO is used, a plurality of second wireless communication terminals may receive one allocated sub-channel. In such a case, the poll frame may include a group identifier for identifying the group of the second wireless communication terminals instead of the identifier for identifying the second wireless communication terminal.

In a specific embodiment, the channel vector information includes channel information allocated to the second wireless communication terminal. At this time, the channel information may include channel index information and sub-channel index information as described above. Specifically, the channel information may be a 2-byte field as in the embodiment of FIG. 8. In addition, the channel vector information indicates channel index information through 12 bits and sub-channel index information through 4 bits. When the first wireless communication terminal uses a frequency band having a bandwidth larger than the minimum unit frequency bandwidth, a field indicating such sub-channel index information may not be used. Specifically, when the minimum unit frequency band is 20 MHz and the first wireless communication terminal uses a frequency band having a bandwidth greater than 20 MHz, the first wireless communication terminal and the second wireless communication terminal may not use the sub-channel index information. In addition, some of the 12 bits indicating the channel index information may be left as reserved bits in preparation for the format change of the channel vector information.

As described above, the poll frame may include a duration field indicating duration information. Also, depending on a specific situation, the duration field may indicate the number of second wireless communication terminals to which the poll frame allocates a frequency channel. Also, depending on a specific situation, the duration field may be information indicating the number of second wireless communication terminals to which the poll frame allocates a channel. At this time, the second wireless communication terminal may determine the length of the poll frame based on the duration field. This is because the length of the poll frame becomes longer as the number of second wireless communication terminals allocating a channel becomes larger.

Channel vector information is described with reference to FIG. 8. A method of displaying a channel index included in channel vector information will be described in detail with reference to FIGS. 9 to 13.

Figure 9:
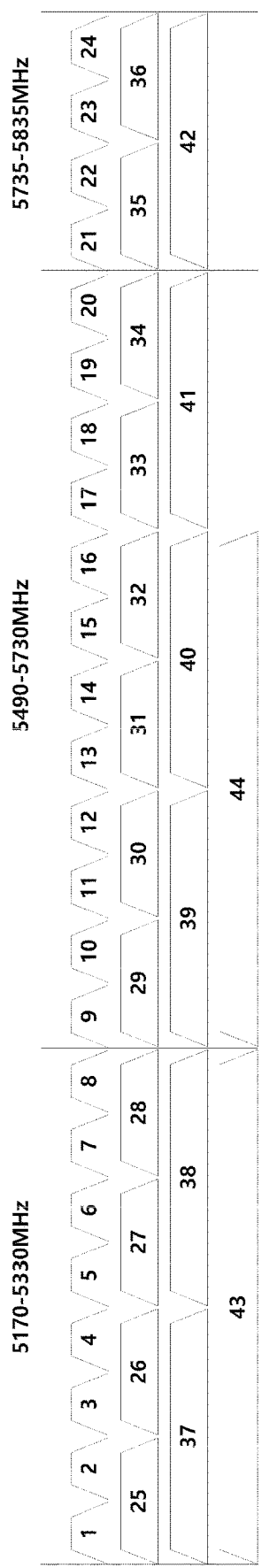
FIG. 9 is a view illustrating a channel index in a frequency band of 5 GHz according to an embodiment of the present invention.
Figure 10:
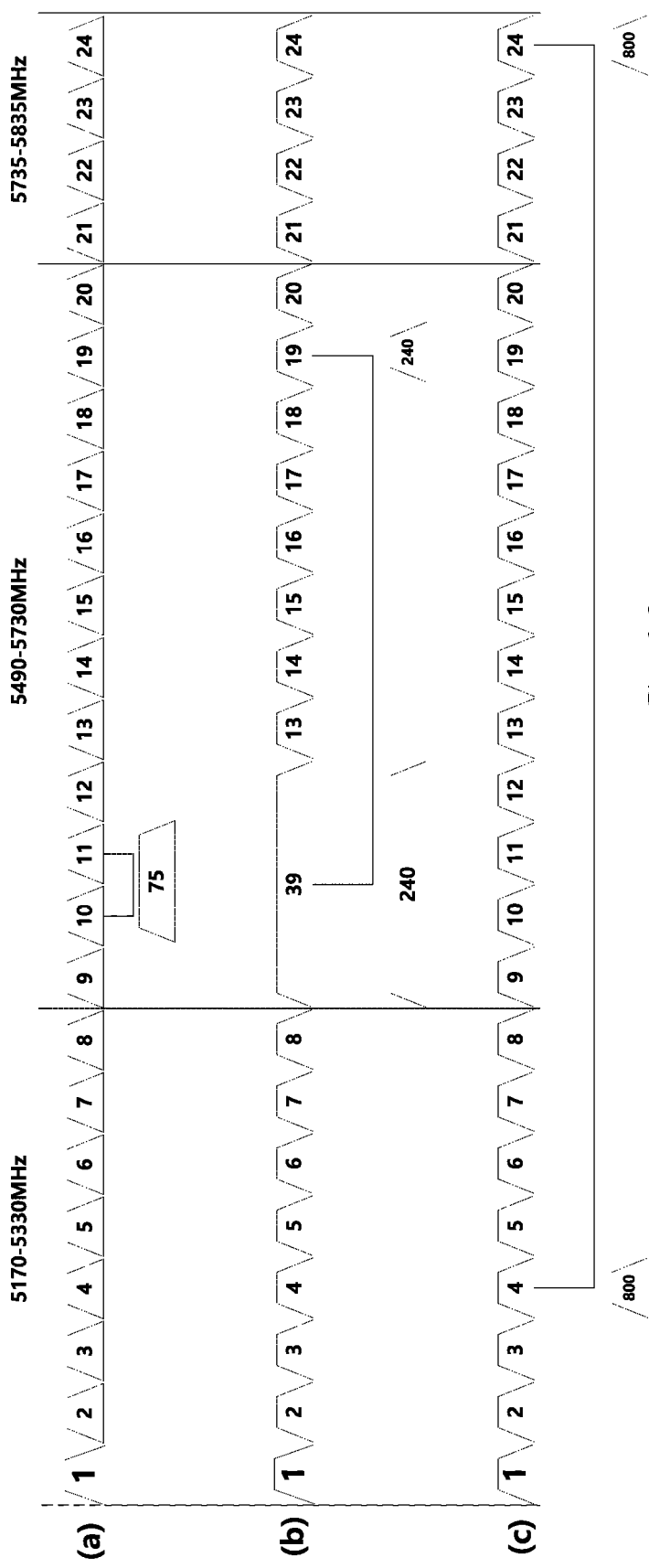
FIG. 10 is a view illustrating a channel index in a frequency band of 5 GHz according to another embodiment of the present invention.

FIG. 9 is a view illustrating a channel index of a 5 GHz frequency band according to an embodiment of the present invention, and FIG. 10 is a view illustrating a channel index of a 5 GHz frequency band according to another embodiment of the present invention.

When the first wireless communication terminal uses only a combination of contiguous frequency bands, the same channel index as in the embodiment of FIG. 9 may be used. In such a case, the number of contiguous frequency channels is 256 or less. Therefore, a field for indicating the channel index information in the channel vector information may be a field of 8 bits or less.

In a specific embodiment, the first wireless communication terminal and the second wireless communication terminal may use a combination of non-contiguous frequency bands. In such a case, the same channel index as in the embodiment of FIG. 10 may be used. For example, the channel index 800 in FIG. 10(c) represents a frequency band combining the frequency bands indicated by each of the channel index 4 and the channel index 24, which are not contiguous to each other. At this time, the number of available channels may be 256 or more. In such a case, a field for indicating the channel index information in the channel vector information may be a field of 8 bits or more. Specifically, the sum of the size of a field indicating channel index information and the size of a field indicating sub-channel index information may be 16 bits. Specifically, the field indicating the channel index information may be a 12-bit field. Also, the first wireless communication terminal and the second wireless communication terminal may use a bandwidth that is not one, two, four, or eight times the minimum unit frequency bandwidth. For example, in the embodiment of FIG. 10(b) in which a minimum unit frequency bandwidth is 20 MHz, the frequency band indicated by the channel index 240 has a 100 MHz bandwidth that is five times the minimum unit frequency bandwidth of 20 MHz. Also, the first wireless communication terminal and the second wireless communication terminal may use frequency bands that is adjacent to but is not utilized simultaneously in 802.11ac. For example, the channel index 75 in FIG. 10(a) represents a frequency band combining the frequency bands indicated by each of the channel index 10 and the channel index 75.

As described above, the channel vector information may include sub-channel index information. At this time, the sub-channel index information may indicate sub-channel or sub-carrier allocation.

In addition, the channel vector information including sub-channel index information may be included in the poll frame as described above. In another specific embodiment, the channel vector information including sub-channel index information may be included in the preamble of a frame transmitted from the first wireless communication terminal to the second wireless communication terminal. At this time, the frame may be a data frame including data. Such sub-channel index information will be described with reference to FIGS. 11 to 18.

Figure 11:
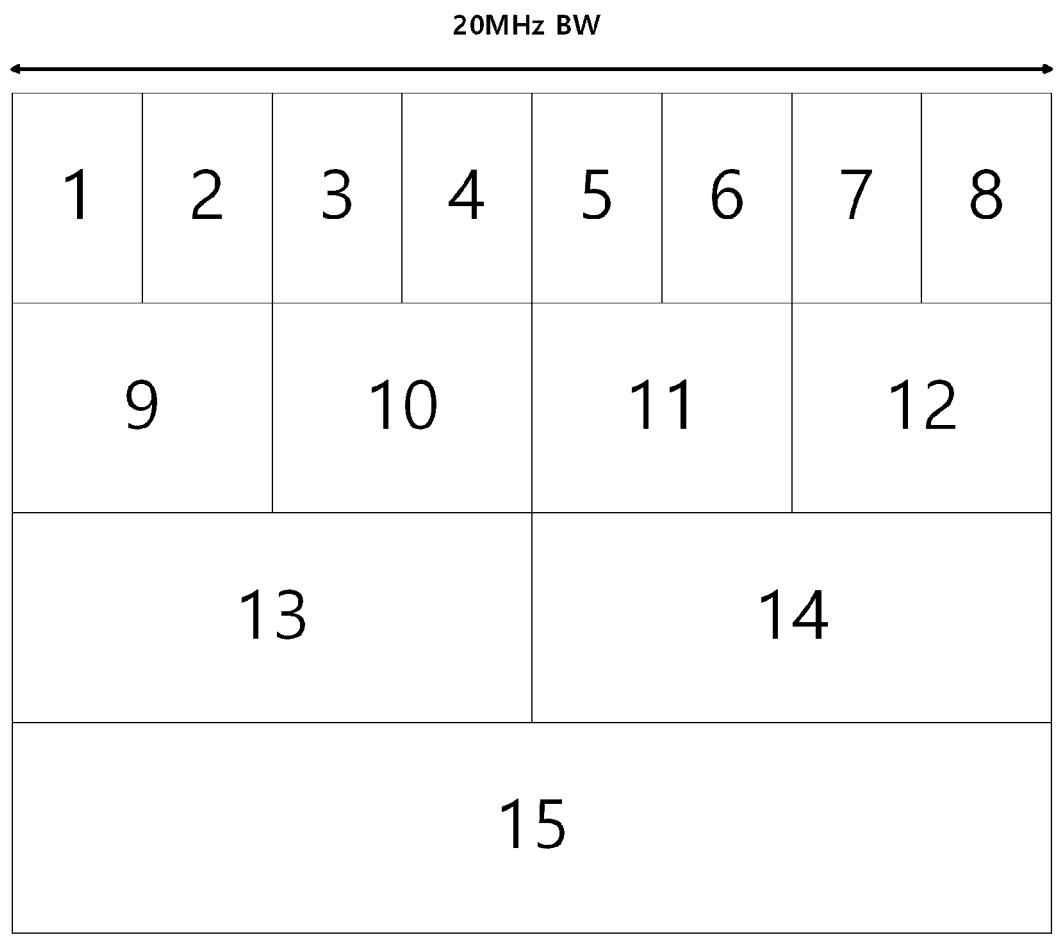
FIG. 11 is a view illustrating a sub-channel index in a frequency band of 20 MHz according to an embodiment of the present invention.

FIG. 11 is a view illustrating a sub-channel index in a frequency band of 20 MHz according to an embodiment of the present invention.

In a specific embodiment, the first wireless communication terminal and the second wireless communication terminal may divide a frequency band having the minimum unit frequency bandwidth into eight sub-frequency bands. At this time, the first wireless communication terminal and the second wireless communication terminal may use a combination of eight sub-frequency bands as a sub-channel. The minimum unit frequency bandwidth may be 20 MHz. The first wireless communication terminal and the second wireless communication terminal may use the fifteen sub-channels as shown in FIG. 11 by combining eight sub-frequency bands with adjacent sub-frequency bands. In addition, when the first wireless communication terminal and the second wireless communication terminal indicate the channel vector information by using the group identifier, the sub-channel index should represent the case that the second wireless communication terminal is included in the corresponding group but does not receive a sub-channel. Therefore, the number of cases that the sub-channel index should express is 16 in total. Therefore, the sub-channel index may be represented by a 4-bit field.

Figure 12:
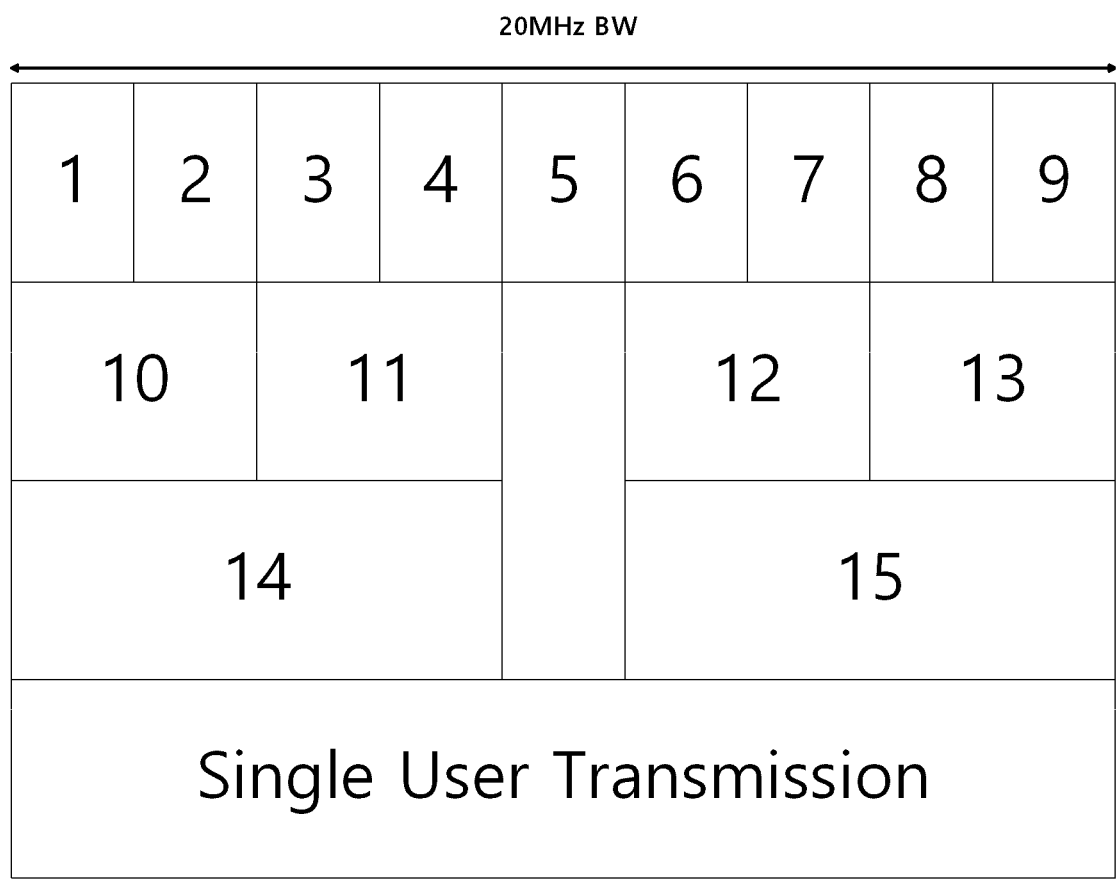
FIG. 12 is a view illustrating a sub-channel index in a frequency band of 20 MHz according to another embodiment of the present invention.

FIG. 12 is a view illustrating a sub-channel index in a frequency band of 20 MHz according to another embodiment of the present invention.

In a specific embodiment, the first wireless communication terminal and the second wireless communication terminal may divide a frequency band having a minimum unit frequency bandwidth into nine sub-frequency bands. The minimum unit frequency bandwidth may be 20 MHz. The first wireless communication terminal and the second wireless communication terminal may use the fifteen sub-channels as shown in FIG. 12 by combining eight sub-frequency bands with adjacent sub-frequency bands except for the fifth sub-frequency band. Except when all the minimum unit frequency bands are used, if the case that channel vector information is indicated using a group identifier is included, the total number of sub-channels is 15. In addition, the sub-channel index should cover the case that the second wireless communication terminal is included in the corresponding group but does not receive a sub-channel. Therefore, the number of cases that the sub-channel index should display is 16 in total. Therefore, the sub-channel index may be represented by a 4-bit field.

Figure 13:
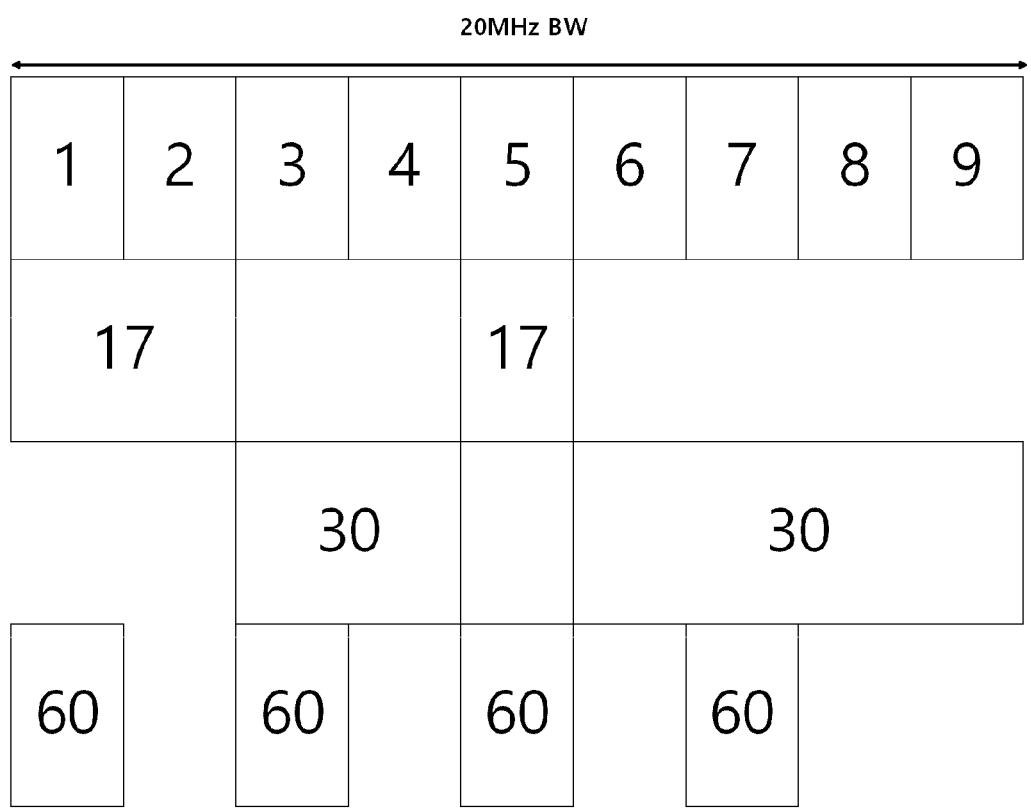
FIG. 13 is a view illustrating a sub-channel index in a frequency band of 20 MHz including a combination of non-contiguous sub-bands according to another embodiment of the present invention.

FIG. 13 is a view illustrating a sub-channel index in a frequency band of 20 MHz including a combination of non-contiguous sub-frequency bands according to another embodiment of the present invention.

In a specific embodiment, the first wireless communication terminal and the second wireless communication terminal may divide a frequency band having a minimum unit frequency bandwidth into nine sub-frequency bands. The minimum unit frequency bandwidth may be 20 MHz. The first wireless communication terminal and the second wireless communication terminal may combine the nine sub-frequency bands without restriction and use them as a sub-channel. Specifically, the first wireless communication terminal and the second wireless communication terminal may combine non-continuous sub-frequency bands and use them as one sub-channel. For example, as shown in FIG. 13, the sub-channel index 17 represents a frequency band obtained by combining frequency bands indicated by the sub-channel index 1, the sub-channel index 2, and the sub-channel index 5. In such a case, since the number of cases that a sub-channel index should represent is 16 or more, the sub-channel index may be represented by a field of 5 bits or more.

The preamble of a signal transmitted from the first wireless communication terminal to the second wireless communication terminal may include information on a frequency band or a sub-carrier allocated to the second wireless communication terminal. In a specific embodiment, the preamble of a signal transmitted from the first wireless communication terminal to the second wireless communication terminal may include sub-channel index information. Specifically, the header of a physical frame including data transmitted from the first wireless communication terminal to each of the plurality of second wireless communication terminals may include information on a frequency band or a sub-carrier allocated to each of the second wireless communication terminals. For example, a physical frame including data transmitted from the first wireless communication terminal to each of the plurality of second wireless communication terminals may include a signaling field for signaling a signal including data transmitted by the physical frame. At this time, the signaling field may include information on a frequency band or a sub-carrier allocated to each of the second wireless communication terminals.

At this time, the signaling field is a field including information for signaling data included in the physical frame. The signaling field may be at least one of SIG-A for signaling information common to a plurality of second wireless communication terminals, SIG-B for signaling information for each of the plurality of second wireless communication terminals, and SIG-C for signaling other information. Through this, the second wireless communication terminal may decode the preamble signal transmitted from the first wireless communication terminal and obtain information on a frequency band or a sub-carrier allocated to the second wireless communication terminal. A specific format of information on the allocated frequency band or sub-carrier included in the preamble of a signal transmitted from the first wireless communication terminal to the second wireless communication terminal will be described with reference to FIGS. 14 to 18.

Figure 14:
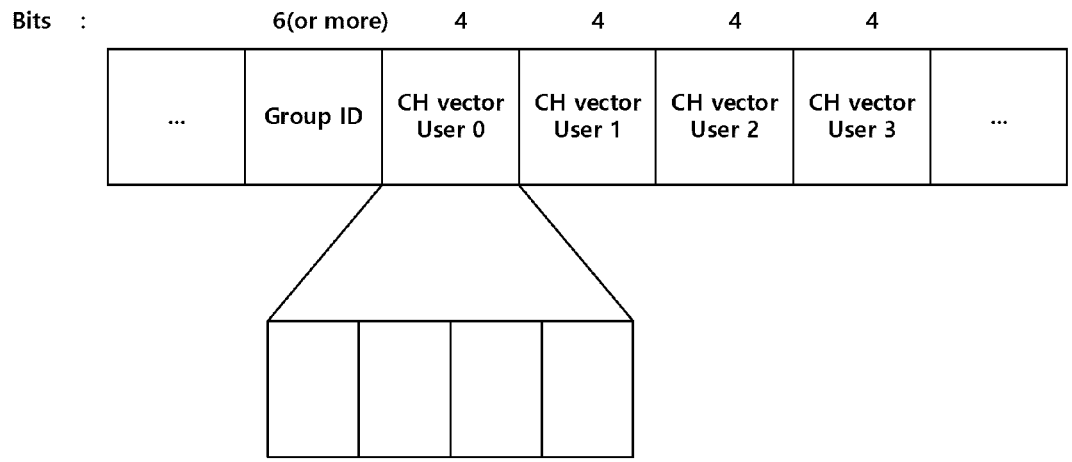
FIG. 14 is a view illustrating a preamble including sub-channel information according to an embodiment of the present invention.

FIG. 14 is a view illustrating a preamble including sub-channel information according to an embodiment of the present invention.

The channel vector information may include channel allocation information in a group unit of the second wireless communication terminals instead of a second wireless communication terminal unit. At this time, the group of the second wireless communication terminals is a set including the plurality of second wireless communication terminals. In addition, the sub-channel information included in the preamble of a signal transmitted from the first wireless communication terminal to the second wireless communication terminal may include the group identifier of a group including the second wireless communication terminal to which the sub-channel is allocated.

In addition, the sub-channel information may include information indicating a sub-channel allocated to the second wireless communication terminal. At this time, the information indicating the sub-channel may be a sub-channel index indicating the sub-channel.

In a specific embodiment, the format of the sub-channel information included in the preamble may be one as shown in FIG. 14. Specifically, the sub-channel information may include a Group ID field indicating a group identifier. In a specific embodiment, the Group ID field may be a field of 6 bits or more. For example, when the maximum number of second wireless communication terminals connected to one first wireless communication terminal is 4, the Group ID field may be a 6-bit field. In addition, when the maximum number of second wireless communication terminals connected to one first wireless communication terminal is more than 4, the Group ID field may be a field of more than 6 bits.

In addition, the sub-channel information may include a CH vector field indicating a sub-channel allocated to the second wireless communication terminal. In a specific embodiment, the CH vector field may indicate that no sub-channel is allocated to the second wireless communication terminal corresponding to the CH vector field. In such a case, the value of the CH vector field corresponding to the second wireless communication terminal not participating in the transmission with the first wireless communication may be zero. In a specific embodiment, the CH vector field may be a 4-bit field. At present, Multi User-Multi Input and Multi Output (MU-MIMO) allows the simultaneous connection of a total of four wireless communication terminals to the first wireless communication terminal. Thus, the sub-channel information may include four CH vector fields. In addition, when the number of second wireless communication terminals that simultaneously access the first wireless communication terminal allowed by MU-MIMO is increased, the number of the CH vector fields may be increased FIG. 15 is a view illustrating a preamble including sub-channel information according to another embodiment of the present invention.

Figure 15:
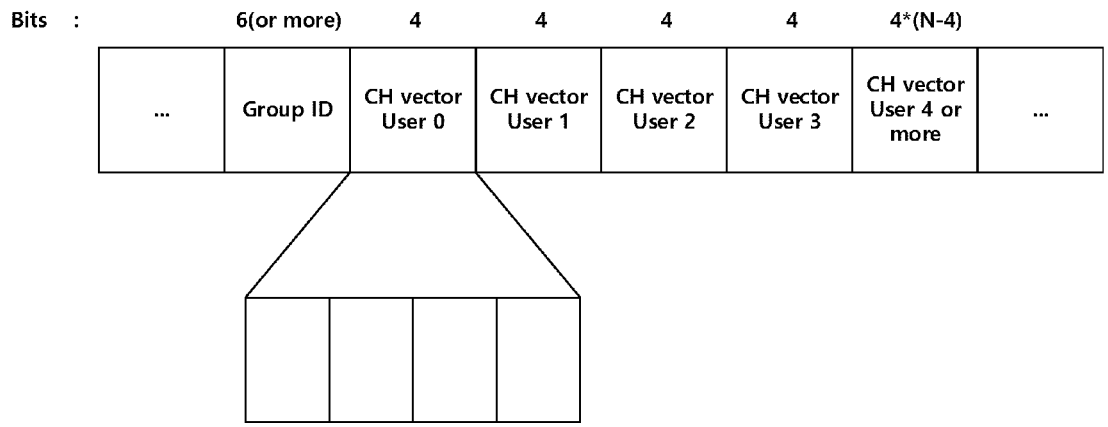
FIG. 15 is a view illustrating a preamble including sub-channel information according to another embodiment of the present invention.

In preparation for the case that the number of second wireless communication terminals connected to one first wireless communication terminal at the same time is increased, the number of CH vector fields may not be limited as shown in FIG. 15.

In such a case, the signaling field including the information on the frequency-band allocated to the second wireless communication terminal has a variable length.

Figure 16:
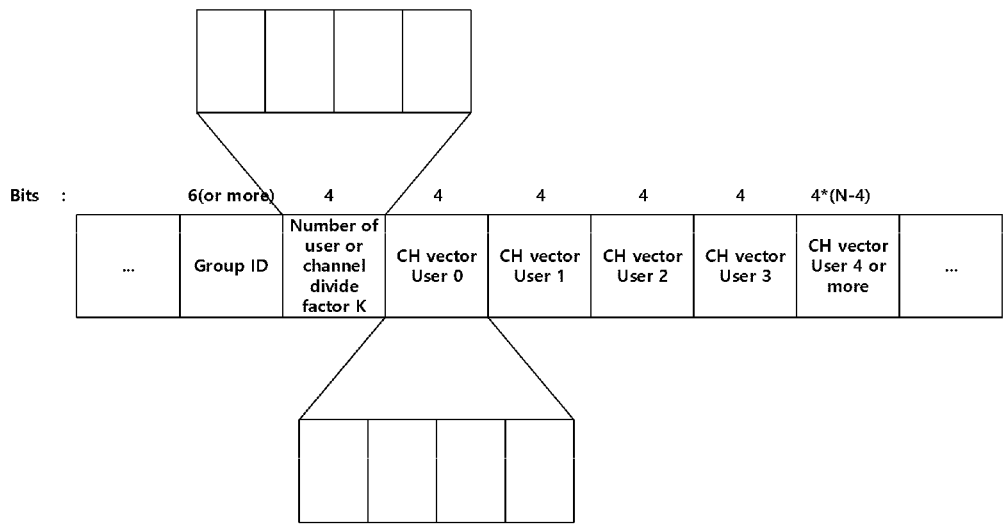
FIG. 16 is a view illustrating a preamble including sub-channel information according to another embodiment of the present invention.

FIG. 16 is a view illustrating a preamble including sub-channel information according to another embodiment of the present invention.

As described with reference to FIG. 15, when the number of CH vector fields is not limited, the second wireless communication terminal has to continuously decode a variable signal without knowing the number of CH vector fields. To solve this problem, the sub-channel information of the preamble included in a signal transmitted from the first wireless communication terminal to the second wireless communication terminal may include information indicating the number of the second wireless communication terminals to which the sub-channel is allocated. In another specific embodiment, if one second wireless communication terminal is allocated per one sub-channel, the sub-channel information may include the number of allocated sub-channels.

In a specific embodiment, the sub-channel information may include a Number of User field indicating the number of second wireless communication terminals to which a sub-channel is allocated, as in the embodiment of FIG. 16. At this time, the Number of User field may be a 4-bit field.

In another specific embodiment, the sub-channel information may include a channel divide factor field indicating the number of sub-channels allocated to the plurality of second wireless communication terminals, as in the embodiment of FIG. 16. At this time, the Channel divide factor field may be a 4-bit field.

Through such an embodiment, the second wireless communication terminal may accurately recognize the size of a preamble to be decoded.

Figure 17:
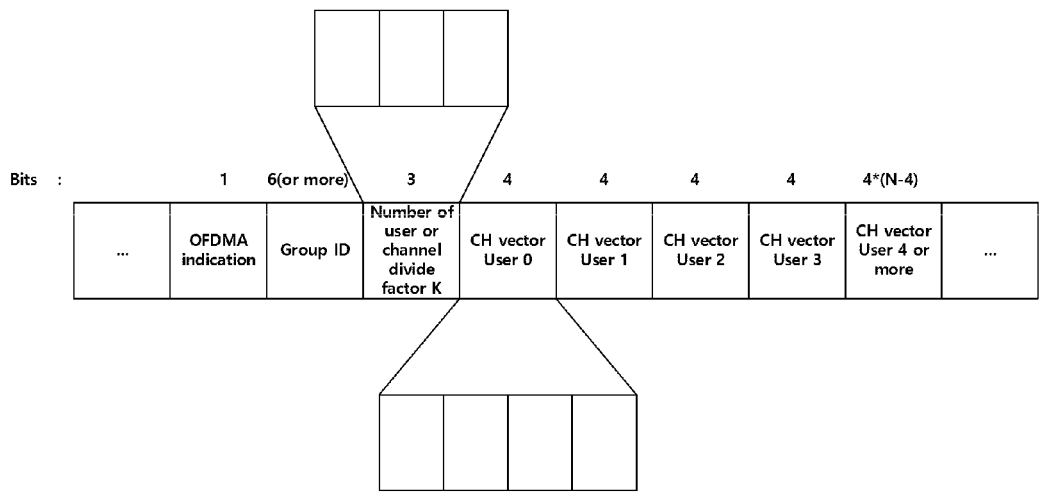
FIG. 17 is a view illustrating a preamble including sub-channel information according to another embodiment of the present invention.

FIG. 17 is a view illustrating a preamble including sub-channel information according to another embodiment of the present invention.

According to the above-described embodiment, even if a sub-channel is not allocated, the second wireless communication terminal should decode all the sub-channel information to determine whether the sub-channel is allocated. In order to prevent this, the sub-channel information included in the preamble of a signal transmitted from the first wireless communication terminal to the second wireless communication terminal may include information indicating whether the OFDMA communication using the sub-channel is used or not.

In a specific embodiment, the sub-channel information may include an OFDMA Indication field indicating whether to use OFDMA communication using a sub-channel, as in the embodiment of FIG. 17. In a specific embodiment, the OFDMA Indication field may be a 1-bit flag. For example, if the value of the OFDMA Indication field is 1, the OFDMA Indication field may indicate that the first wireless communication terminal allocates a sub-channel to the second wireless communication terminal for OFDMA communication using the sub-channel.

When the OFDMA Indication field is a 1-bit flag, the Number of User field described above may be a 3-bit field. Also, if the value indicated by the Number of User field is N, it may indicate that a sub-channel is allocated to the N−2 second wireless communication terminal. The reason why the sub-channel is allocated to the N−2 second wireless communication terminals instead of the N second wireless communication terminals is that the sub channel is allocated to two or more second wireless communication terminals when OFDMA communication using the sub-channel is used.

Figure 18:
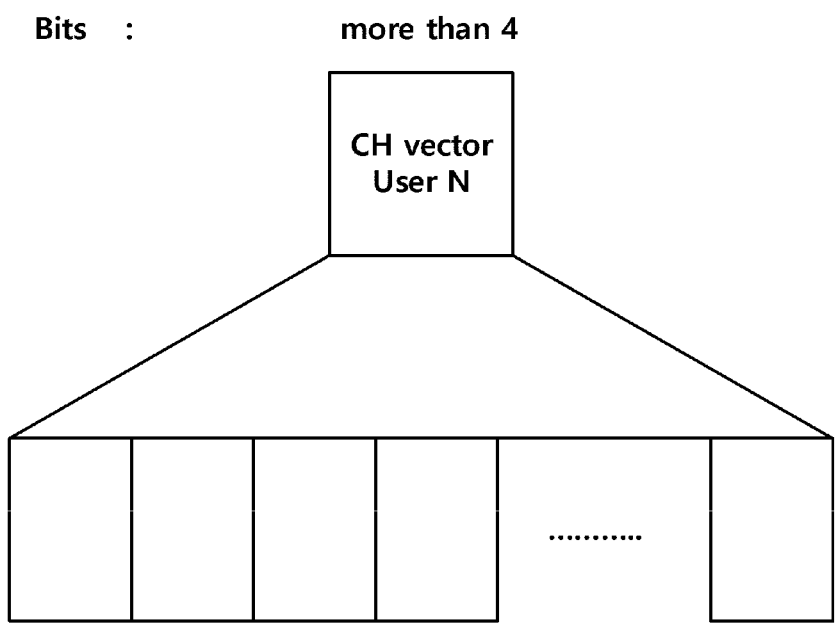
FIG. 18 is a view illustrating a CH vector field indicating a combination of non-contiguous sub-band channels according to another embodiment of the present invention.

FIG. 18 is a view illustrating a CH vector field indicating a combination of non-contiguous sub-band channels according to another embodiment of the present invention.

In the above-described specific embodiment, it is described that the CH vector field included in the sub-channel information may be 4 bits. However, when a sub-channel indicating a combination of non-contiguous sub-bands is supported, the number of sub-channels is increased, so that the CH vector field may be a field of 5 bits or more.

With reference to FIGS. 19 to 24, a method of transmitting a control frame when the first wireless communication terminal transmits data to a plurality of second wireless communication terminals will be described.

Figure 19:
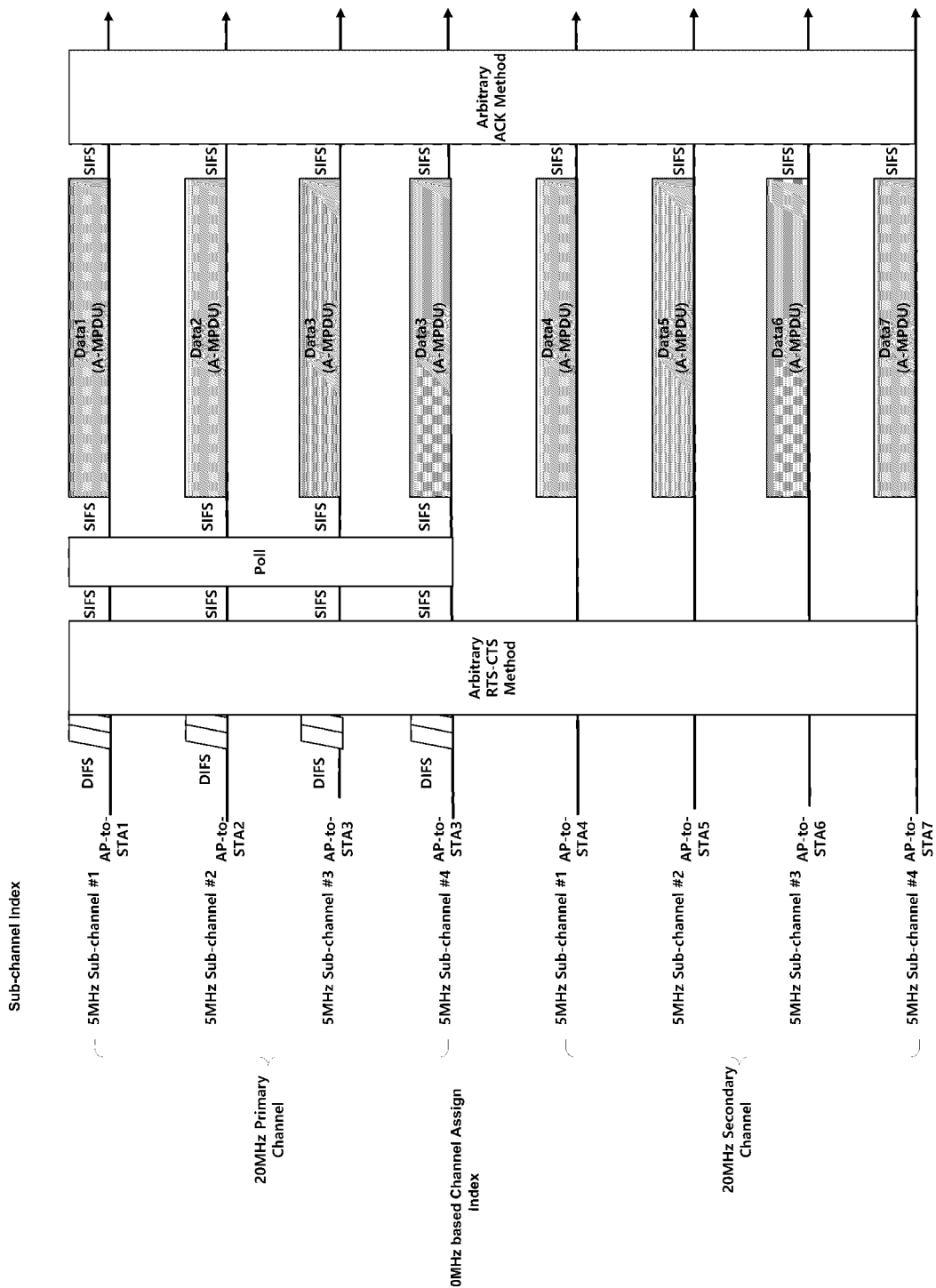
FIG. 19 shows that an access point transmits data to a plurality of stations using a poll frame.

FIG. 19 is a view illustrating that an access point transmits data to a plurality of stations using a poll frame.

The first wireless communication terminal may set a network allocation vector (NAV) through various embodiments. Specifically, the first wireless communication terminal may transmit a transmission notification frame for notifying data transmission to a plurality of second wireless communication terminals that are to transmit data. At this time, each of the plurality of second wireless communication terminals may transmit a reception ready frame indicating that each second wireless communication terminal is ready to receive data. In a specific embodiment, the transmission notification frame may be a Request to Send (RTS) frame. In addition, the reception ready frame may be a Clear to Send (CTS) frame. In yet another specific embodiment, the setting of the NAV may be omitted.

The first wireless communication terminal transmits the above-described poll frame to the plurality of second wireless communication terminals. Specifically, the first wireless communication terminal may transmit the poll frame to the plurality of second wireless communication terminals through the primary channel of a frequency band used by the first wireless communication terminal. At this time, the primary channel represents a channel having a minimum unit frequency bandwidth from the minimum frequency value of a frequency band used by the first wireless communication terminal. Also, a secondary channel represents a channel other than the primary channel. In another specific embodiment, the first wireless communication terminal may transmit the poll frame through a secondary channel as well as a primary channel. When the first wireless communication terminal transmits the poll frame only through a primary channel, a wireless communication terminal belonging to a BSS different from that of the first wireless communication terminal may access a secondary channel. As described above, when the first wireless communication terminal transmits the poll frame through the primary channel in addition to the secondary channel, it is possible to prevent a wireless communication terminal belonging to another BSS from accessing the secondary channel.

Each of the plurality of second wireless communication terminals receives a poll frame.

Each of the plurality of second wireless communication terminals may determine whether the first wireless communication terminal transmits data to each of the plurality of second wireless communication terminals based on the poll frame. Specifically, when the poll frame includes an identifier indicating the second wireless communication terminal, the second wireless communication terminal may determine that the first wireless communication terminal transmits data to the second wireless communication terminal.

Further, each of the plurality of second wireless communication terminals may obtain information on a frequency band allocated to each of the plurality of second wireless communication terminals based on the poll frame. Specifically, each of the plurality of second wireless communication terminals may obtain the above-described channel vector information from the poll frame. For example, each of the plurality of second wireless communication terminals may obtain information on a channel allocated to the second wireless communication terminal and information on a sub-channel from the poll frame.

The first wireless communication terminal transmits data to each of the plurality of second wireless communication terminals through a frequency band allocated to each of the plurality of second wireless communication terminals.

Each of the plurality of second wireless communication terminals that receive the data may transmit a transmission completion frame indicating transmission completion to the first wireless communication terminal through various embodiments. Specifically, each of the plurality of second wireless communication terminals may transmit a transmission completion frame to the first wireless communication terminal through a frequency band allocated to each of the plurality of second wireless communication terminals. In addition, the transmission completion frame may be an ACK frame.

In the embodiment of FIG. 19, the access point AP and the first station STA1 to the seventh station STA7 set the NAV for data transmission through various methods. At this time, the access point AP and the first station STA1 to the seventh station STA7 may set the NAV through the RTS frame and the CTS frame.

The access point AP transmits a poll frame through a primary channel having a bandwidth of 20 MHz. As described above, the poll frame includes information on a frequency band allocated to each of the first station STA1 to the seventh stations STA7.

Each of the first station STA1 to the seventh stations STA7 receives the poll frame and obtains information on the frequency band allocated to each of the first station STA1 to the seventh stations STA7.

The access point AP transmits data to the first station STA1 to the seventh station STA7 through the frequency band allocated to each of the first station STA1 to the seventh station STA7. Specifically, the access point AP transmits data to the first station STA1 through the first sub-channel Sub-channel #1 of the primary channel. In addition, the access point AP transmits data to the second station STA2 through the second sub-channel Sub-channel #2 of the primary channel. In addition, the access point AP transmits data to the third station STA3 through the third sub-channel Sub-channel #3 and the fourth sub-channel Sub-channel #4 of the primary channel. In addition, the access point AP transmits data to the fourth station STA4 through the first sub-channel Sub-channel #1 of the secondary channel. In addition, the access point AP transmits data to the fifth station STA5 through the second sub-channel Sub-channel #2 of the secondary channel. In addition, the access point AP transmits data to the sixth station STA6 through the third sub-channel Sub-channel #3 of the secondary channel. In addition, the access point AP transmits data to the seventh station STA7 through the fourth sub-channel Sub-channel #4 of the secondary channel.

Each of the first station STA1 to the seventh station STA7 receives data through a frequency band allocated to each of the first station STA1 to the seventh station STA7.

Each of the first station STA1 to the seventh station STA7 may transmit the ACK frame to the first wireless communication terminal through various embodiments.

However, in such an embodiment, when the RTS frame does not signal the second wireless communication terminal that is to receive data, the second wireless communication terminal knows that the first wireless communication terminal transmits the data after receiving the poll frame. Therefore, the first wireless communication terminal may not receive the CTS frame from the second wireless communication terminal before the poll frame transmission. To solve this, a modified RTS frame is needed. This will be described later with reference to FIG. 22.

Figure 20:
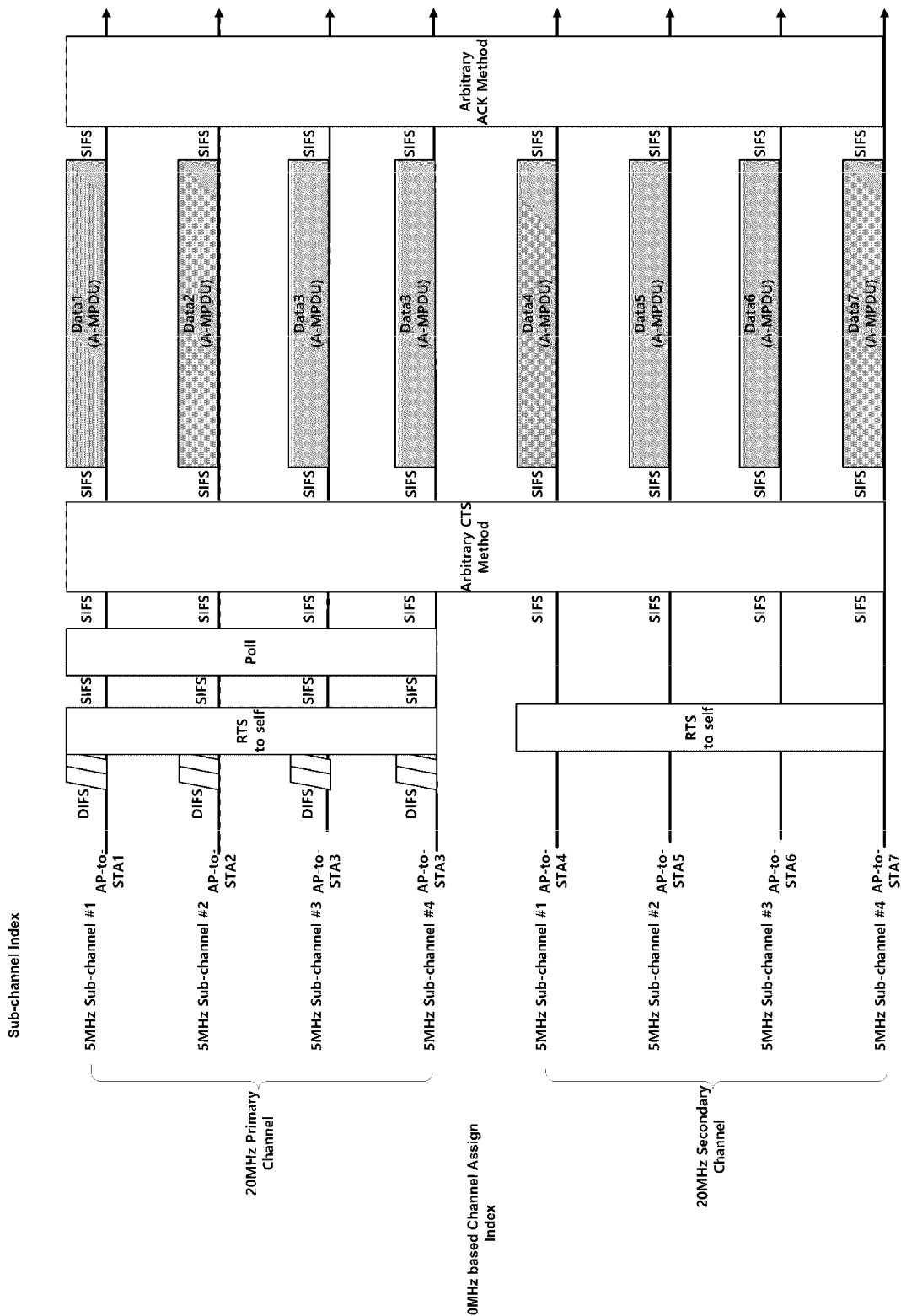
FIG. 20 is a view illustrating that an access point transmits an RTS-to-Self frame and transmits data to a plurality of stations after transmitting a poll frame.

FIG. 20 is a view illustrating that an access point transmits an RTS-to-Self frame and transmits data to a plurality of stations after transmitting a poll frame.

The first wireless communication terminal may transmit a frame for notifying the first wireless communication terminal is to transmit data to the plurality of second wireless communication terminals. The frame for notifying that the first wireless communication terminal is to transmit data to the plurality of second wireless communication terminals may be an RTS-to-Self frame. The RTS-to-Self frame represents an RTS frame of which receiver address is a wireless communication terminal that transmits a frame. The format of a specific frame other than the receiver address may be the same as the format of the RTS frame defined by the 802.11 standard.

The first wireless communication terminal may transmit the RTS-to-Self frame to the plurality of second wireless communication terminals through the frequency band having a bandwidth equal to or greater than the minimum unit bandwidth. Specifically, the first wireless communication terminal may transmit the RTS-to-Self frame to the plurality of second wireless communication terminals through the frequency band having the minimum unit bandwidth. At this time, the minimum unit bandwidth may be 20 MHz as described above. Through this, the first wireless communication terminal allows a wireless communication terminal, which is not able to detect a frequency band less than the minimum unit bandwidth, to set the NAV.

In a specific embodiment, the first wireless communication terminal may transmit the RTS-to-Self frame to the plurality of second wireless communication terminals through the primary channel of a frequency band used by the first wireless communication terminal. In another specific embodiment, the first wireless communication terminal may transmit the RTS-to-Self frame through a secondary channel as well as a primary channel. When the first wireless communication terminal transmits the RTS-to-Self frame only through a primary channel, a wireless communication terminal belonging to a BSS different from that of the first wireless communication terminal may access a secondary channel. As described above, when the first wireless communication terminal transmits the RTS-to-Self frame through the primary channel in addition to the secondary channel, it is possible to prevent a wireless communication terminal belonging to another BSS from accessing the secondary channel.

Also, the first wireless communication terminal may transmit the above-described poll frame to the plurality of second wireless communication terminals when a predetermined time elapses after the transmitting of the RTS-to-Self frame. At this time, the predetermined time may be a Short Inter-Frame Space (SIFS) defined in the 802.11 standard.

As described above, each of the plurality of second wireless communication terminals may determine whether the first wireless communication terminal transmits data to each of the plurality of second wireless communication terminals based on the poll frame. Further, each of the plurality of second wireless communication terminals may obtain information on a frequency band allocated to each of the plurality of second wireless communication terminals based on the poll frame.

Each of the plurality of second wireless communication terminals that receive the poll frame transmits a response frame for the poll frame to the first wireless communication terminal after a predetermined time from the poll frame transmission time. At this time, the predetermined time may be SIFS defined in the 802.11 standard. If a time for the second wireless communication terminal to process the poll frame is insufficient, the predetermined time may be the Point Coordinate Inter-Frame Space (PIFS) defined by the 802.11 standard or longer.

In the embodiment of FIG. 20, the first wireless communication terminal transmits the RTS-to-Self frame when a channel is idle for a predetermined time or longer. At this point, the predetermined time may be Distributed Inter-Frame Space (DIFS) defined in 802.11. Specifically, the first wireless communication terminal transmits an RTS-to-Self frame in each minimum frequency bandwidth. At this time, the minimum unit frequency bandwidth is 20 MHz.

The first wireless communication terminal transmits the poll frame to the plurality of second wireless communication terminals. Specifically, after SIFS from when the RTS-to-Self frame is transmitted, the first wireless communication terminal transmits a poll frame to the plurality of second wireless communication terminals. At this time, the first wireless communication terminal may transmit the poll frame to the plurality of second wireless communication terminals through the primary channel.

Each of the plurality of second wireless communication terminals may transmit a CTS frame to the first wireless communication terminal through various embodiments. Then, the operations of the first wireless communication terminal and the second wireless communication terminal may be the same as those of the embodiment of FIG. 19.

Figure 21:
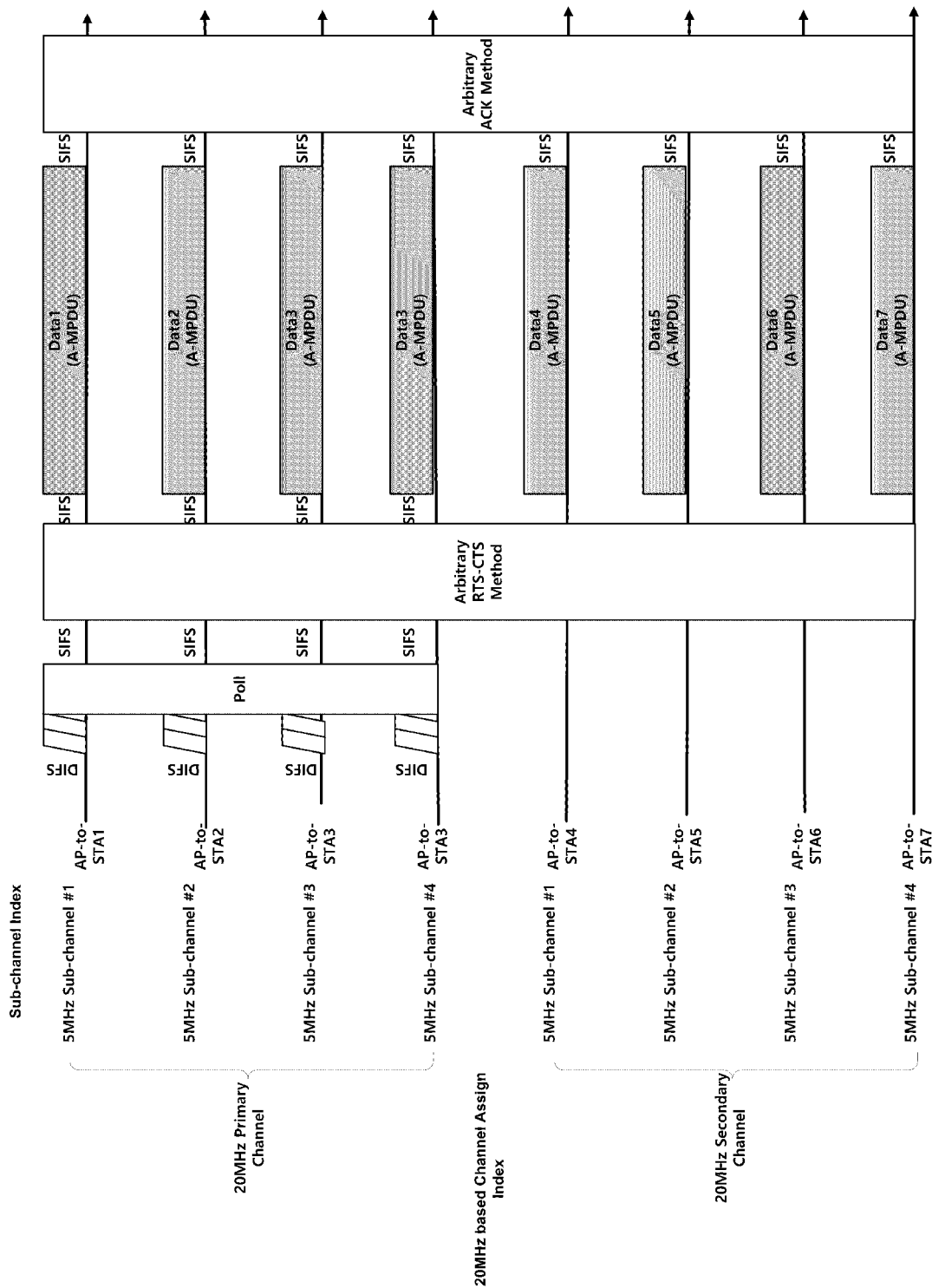
FIG. 21 is a view illustrating that an access point transmits a poll frame before transmitting an RTS frame and a CTS frame and transmits data to a plurality of stations.

FIG. 21 is a view illustrating that an access point transmits a poll frame before transmitting an RTS frame and a CTS frame and transmits data to a plurality of stations.

The first wireless communication terminal may transmit the poll frame to the plurality of second wireless communication terminals before setting the NAV. Specifically, the first wireless communication terminal may transmit the poll frame before transmitting the RTS frame to the plurality of second wireless communication terminals. Through this, the first wireless communication terminal may quickly signal information on the plurality of second wireless communication terminals that are to receive data to the plurality of second wireless communication terminals. At this time, the information on the plurality of second wireless communication terminals that are to receive data may be information for identifying the plurality of second wireless communication terminals that are to receive data. Specifically, the information for identifying the plurality of second wireless communication terminals may be an identifier for identifying each of the plurality of second wireless communication terminals. In addition, the information on the plurality of second wireless communication terminals that are to receive data may be information on a frequency band allocated to each of the plurality of second wireless communication terminals. The information on the frequency band allocated to each of the plurality of second wireless communication terminals may include at least one of information on a channel and information on a sub-channel.

After the first wireless communication terminal transmits a poll frame, the first wireless communication terminal and the second wireless communication terminal may set the NAV through various embodiments. Specifically, the first wireless communication terminal and the second wireless communication terminal may set the NAV through the RTS frame and the CTS frame.

In the embodiment of FIG. 21, when the frequency band is idle for a predetermined time or longer, the access point AP transmits a poll frame to the first station STA1 to the seventh station STA7. At this time, the predetermined time may be DIFS defined in 802.11.

The access point AP transmits a poll frame through a primary channel having a minimum unit frequency bandwidth. At this time, the minimum unit frequency bandwidth is 20 MHz.

The access point AP and the first station STA1 to the fourth station STA7 set the NAV through various embodiments. Specifically, the access point AP and the first station STA1 to the fourth station STA7 set the NAV through the RTS frame and the CTS frame.

Then, operations of the access point AP and the first station STA1 to the seventh station STA7 may be the same as those of the embodiment of FIG. 19 described above.

The embodiments described with reference to FIGS. 19 to 21 may be based on setting a NAV through transmission of an legacy RTS frame and CTS frame. When a new type RTS frame is used, data transmission using OFDMA is signaled to a plurality of second wireless communication terminals without transmission of a poll frame. This will be described with reference to FIG. 22.

Figure 22:
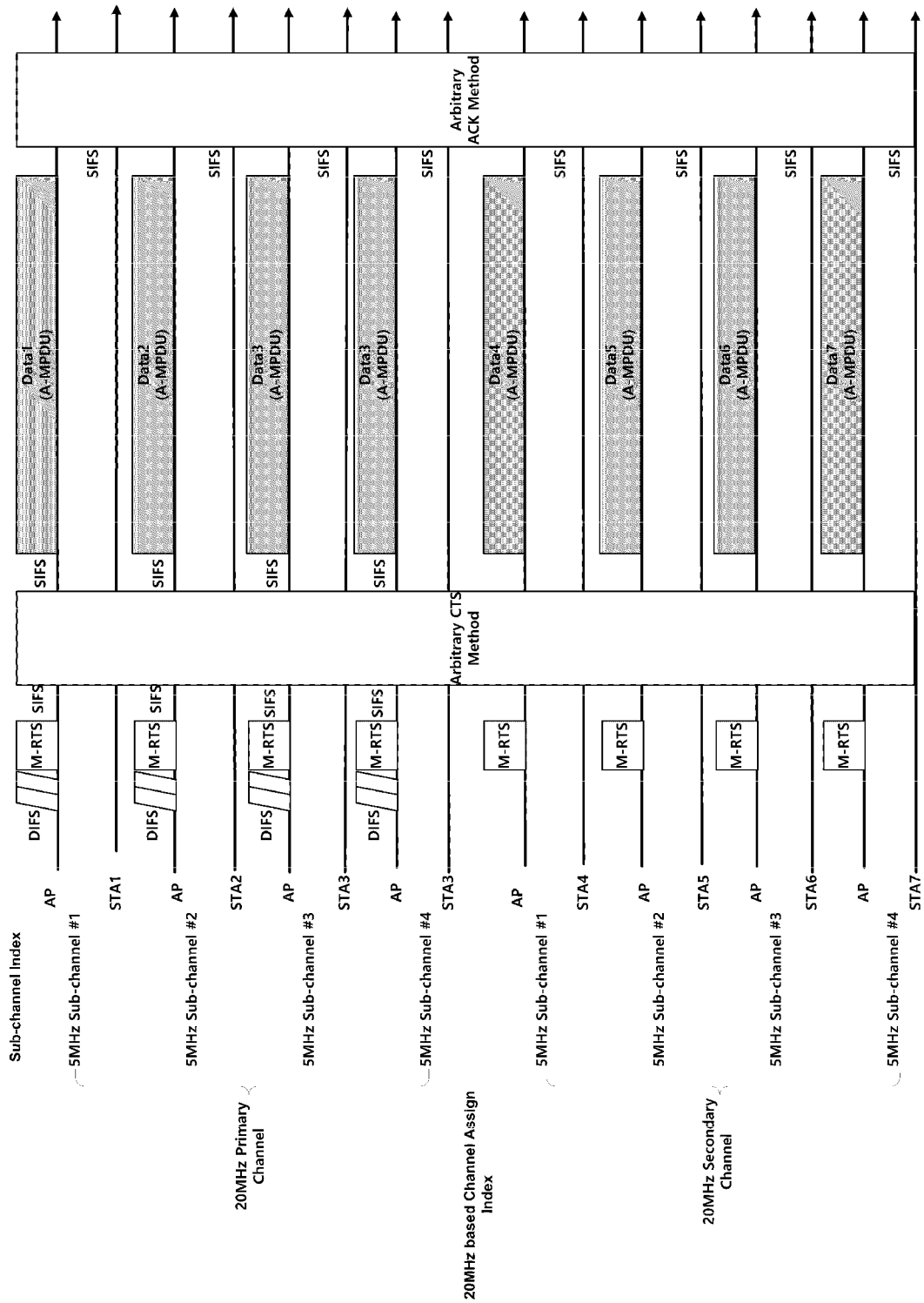
FIG. 22 is a view illustrating that an access point transmits data to a plurality of stations using an M-RTS frame.

FIG. 22 is a view illustrating that an access point transmits data to a plurality of stations using an M-RTS frame.

The first wireless communication terminal may transmit a frame for simultaneously notifying the plurality of second wireless communication terminals that it is ready to transmit data. At this time, the frame for simultaneously notifying the plurality of second wireless communication terminals that it is ready to transmit data may be referred to as Multiple-RTS (M-RTS).

Specifically, the M-RTS frame may include information on a plurality of second wireless communication terminals to which the first wireless communication terminal transmits data. The information on the plurality of second wireless communication terminals may include an identifier for identifying each of the plurality of second wireless communication terminals. In addition, the information on the plurality of second wireless communication terminals may include information on a frequency band allocated to each of the plurality of second wireless communication terminals. The information on the frequency band may include at least one of information on a primary channel and information on a sub-channel. When the information on the plurality of second wireless communication terminals does not include information on the frequency band allocated to each of the plurality of second wireless communication terminals, the preamble of a signal including a data frame or an M-RTS frame, each of which is transmitted by the first wireless communication terminal to the second wireless communication terminal, may include information on a frequency band allocated to each of the plurality of second wireless communication terminals.

Also, the first wireless communication terminal may transmit the M-RTS frame to the plurality of second wireless communication terminals through the primary channel having the minimum unit bandwidth. In such a case, the plurality of second wireless communication terminals may decode another channel as necessary while decoding the primary channel. Therefore, the operation efficiency of the second wireless communication terminal may be increased.

In another specific embodiment, the first wireless communication terminal may transmit an M-RTS frame for each channel having a minimum unit bandwidth. In such a case, the M-RTS frame may include only information on the second wireless communication terminal that receives a corresponding allocated channel. For example, if the maximum number of second wireless communication terminals capable of receiving data through a channel having a minimum unit bandwidth is four, the M-RTS frame may include information on up to four second wireless communication terminals.

In another specific embodiment, the first wireless communication terminal may transmit an M-RTS frame to each of the plurality of second wireless communication terminals through a frequency band allocated to the plurality of second wireless communication terminals. At this time, if the bandwidth of a frequency band allocated to the plurality of second wireless communication terminals is the minimum unit frequency bandwidth, it is possible to transmit an legacy RTS frame. If the bandwidth of the frequency band allocated to the plurality of second wireless communication terminals is smaller than the minimum unit frequency bandwidth, the first wireless communication terminal may transmit an M-RTS frame.

In the embodiment of FIG. 22, the access point AP transmits an M-RTS frame to each of the first station STA1 to the seventh station STA7 when the frequency band is idle for a predetermined time. At this time, the predetermined time may be DIFS defined in the 802.11 standard.

Specifically, the access point AP transmits an M-RTS frame to each of the first station STA1 to the seventh station STA7 through a channel allocated to each of the first station STA1 to the seventh station STA7. At this time, since a sub-channel having a bandwidth of 5 MHz is allocated to each of the first station STA1 to the seventh station STA7, the access point AP transmits an M-RTS frame to each of the first station STA1 to the seventh station STA7 through the sub-channel having a bandwidth of 5 MHz.

Each of the first station STA1 to the seventh station STA7 may transmit a CTS frame to the access point AP through various embodiments.

Then, operations of the access point AP and the first station STA1 to the seventh station STAT may be the same as those of the embodiments of FIGS. 19 to 21 described above.

Through such an embodiment, the first wireless communication terminal may reduce the time for transmitting a control frame in order to signal the plurality of second wireless communication terminals and set a NAV, as compared with the above-described embodiment.

However, since the M-RTS frame has a format different from that of the legacy RTS frame, there is an issue that the NAV of a wireless communication terminal that does not support the embodiment of the present invention may not be set.

As described above, the first wireless communication terminal may signal the frequency band allocated to the plurality of second wireless communication terminals through the preamble of a wireless communication signal. The structure of a physical frame and the concrete format of a signaling field for the above included in the physical frame will be described in detail with reference to FIGS. 23 and 24.

Figure 23:
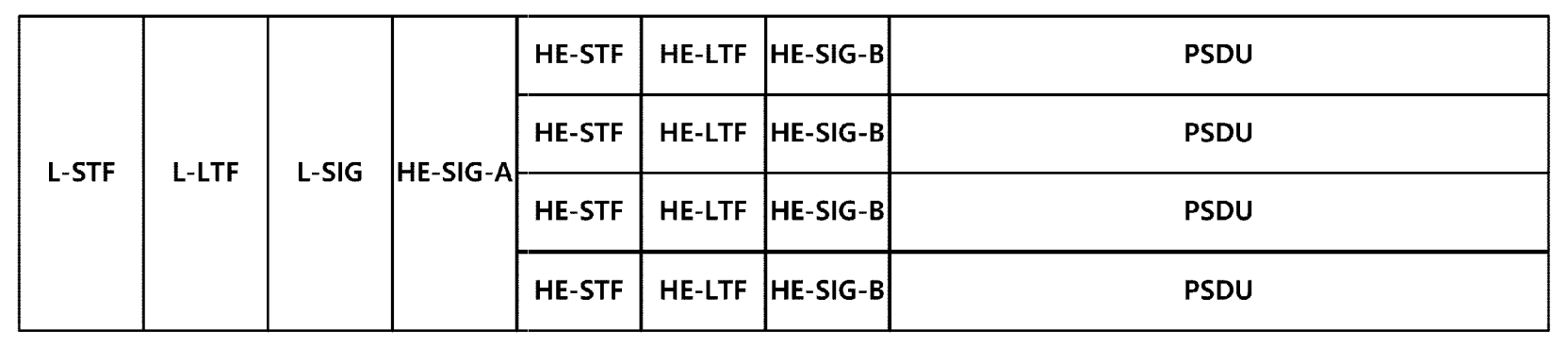

FIG. 23 is a view illustrating a physical frame according to an embodiment of the present invention.

The signaling field included in the physical frame may include information on a frequency band allocated to each of the plurality of second wireless communication terminals. The information on the frequency band allocated to each of the plurality of second wireless communication terminals may include the above-described channel vector information.

In addition, the signaling field may include information on a frequency band allocated to each of the plurality of second wireless communication terminals for each of the plurality of second wireless communication terminals. Specifically, the signaling field may include a plurality of fields, and each of the plurality of fields may indicate a set of information on a frequency band allocated to each of the plurality of second wireless communication terminals. Through this, the signaling field decoding efficiency of the second wireless communication terminal may be improved. Specifically, the second wireless communication terminal may decode a field indicating a set of information on a frequency band allocated to the second wireless communication terminal, and may not decode a field located after the field indicating the second wireless communication terminal.

In a specific embodiment, the signaling field includes a SIG-A field including information commonly applied to the plurality of second wireless communication terminals and a SIG-B field including information on each of the plurality of second wireless communication terminals. At this time, the SIG-B field may include information on the frequency-band allocated to each of the plurality of second wireless communication terminals.

Also, such a physical frame may be a data frame including data transmitted by the first wireless communication terminal to each of the plurality of second wireless communication terminals, as described above.

In addition, the physical frame may include a training signal for each sub-channel allocated to the plurality of second wireless communication terminals. The training signal is a signal that assists the demodulation and decoding setting of a wireless communication terminal for receiving the signal to be transmitted after the transmission of the training signal. Specifically, the physical frame may include a short training signal and a long training signal for each sub-channel allocated to the plurality of second wireless communication terminals.

A wireless communication terminal supporting an embodiment of the present invention may perform Automatic Gain Control (AGC) on an OFDM symbol including data in a long training signal and a payload based on a short training signal. In addition, a wireless communication terminal supporting an embodiment of the present invention may perform synchronization with respect to the timing and frequency of an OFDM symbol including data in a long training signal and a payload, based on a short training signal.

A wireless communication terminal supporting an embodiment of the present invention may estimate the fine frequency offset and the channel of an OFDM symbol including data included in the payload of a long training signal.

In the embodiment of FIG. 23, the physical frame includes an L-STF field, an L-LTF field, an L-SIG field, an HE-SIG-A field, an HE-STF field, an HE-LTF field, and an HE-SIG-B field.

The L-STF field indicates a short training signal decoded by both a wireless communication terminal supporting the embodiment of the present invention and a wireless communication terminal not supporting the embodiment of the present invention. The short training signal is a training signal having a relatively short signal length. Specifically, a wireless communication terminal may perform Automatic Gain Control (AGC) on an OFDM symbol including an L-LTF field and an L-SIG field based on a short training signal, and synchronize a timing and a frequency with the OFDM symbol including the L-SIG field.

The L-LTF field indicates a long training signal decoded by both a wireless communication terminal supporting the embodiment of the present invention and a wireless communication terminal not supporting the embodiment of the present invention. The long training signal is a training signal having a relatively long signal length. Specifically, the wireless communication terminal may estimate the fine frequency offset and the channel of the OFDM symbol including the L-SIG field based on the long training signal.

The L-SIG field is signaling information decoded by both a wireless communication terminal supporting the embodiment of the present invention and a wireless communication terminal not supporting the embodiment of the present invention. Specifically, the L-SIG field indicates information on a data rate and a data length.

The HE-SIG-A field indicates information that is commonly applied to a plurality of second wireless communication terminals. Specifically, the HE-SIG-A field may be the above-described SIG-A field.

The HE-STF field indicates a short training signal that the wireless communication terminal supporting the embodiment of the present invention decodes. A wireless communication terminal supporting an embodiment of the present invention may perform Automatic Gain Control (AGC) on an OFDM symbol included in the HE-LTF field, the HE-SIG-B field, and the payload based on a short training signal. In addition, a wireless communication terminal supporting an embodiment of the present invention may perform synchronization on the timing and frequency of an OFDM symbol included in the HE-LTF field, the HE-SIG-B field, and the payload based on a short training signal.

The HE-LTF field indicates a long training signal that the wireless communication terminal supporting the embodiment of the present invention decodes. A wireless communication terminal supporting an embodiment of the present invention may estimate the fine frequency offset and channel of an OFDM symbol included in the HE-LTF field, the HE-SIG-B field, and the payload based on a long training signal.

The HE-SIG-B field indicates information on a plurality of second wireless communication terminals. Specifically, the HE-SIG-B field may be the above-described SIG-B field.

The PSDU indicates the payload included in the physical frame.

FIG. 24 is a view illustrating a signaling field in a physical frame according to an embodiment of the present invention.

As described above, the signaling field included in the physical frame may include information on a frequency band allocated to each of the plurality of second wireless communication terminals. Specifically, the signaling field may include bandwidth information indicating a bandwidth of a frequency band allocated to the second wireless communication terminal. In addition, the signaling field may include STBC information indicating whether space-time block coding (STBC) is applied to data included in the payload. In addition, the signaling field may include second wireless communication terminal identifier information for identifying a second wireless communication terminal corresponding to information signaled by the signaling field. When the same frequency band is allocated to a plurality of second wireless communication terminals, the signaling field may include group identifier information for identifying a group including a second wireless communication terminal corresponding to information signaled by the signaling field. Also, the signaling field may include stream number information indicating a space-time stream number transmitted through a frequency band allocated to the second wireless communication terminal. In addition, the signaling field may include convolution coding information indicating whether convolution coding is applied to data transmitted to the second wireless communication terminal. Further, the signaling field may include extra symbol information indicating whether or not an extra OFDM symbol is required by applying an LDPC coding to a signal including data to be transmitted to the second wireless communication terminal. The signaling field may include Modulation and Coding Scheme (MCS) information indicating an MCS of a signal including data transmitted to the second wireless communication terminal.

Also, the signaling field may include a plurality of fields. At this time, each of the plurality of fields may represent a set of information on a frequency band allocated to each of the plurality of second wireless communication terminals. Specifically, the signaling field may include a first field indicating a set of information on a frequency band allocated to any one second wireless communication terminal, and a second field indicating a set of information on a frequency band allocated to another second wireless communication terminal after the first field. At this time, each of the first field and the second field may include at least one of the bandwidth information, the STBC information, the second wireless communication terminal identifier information, the group identifier information, the stream number information, the convolution coding information, the extra symbol information, and the MCS information. Any one of the second wireless communication terminals may decode the first field and may not decode the second field.

In the embodiment of FIG. 24, the signaling field may include a Bandwidth field, an STBC field, a Group ID field, a Number of space-time streams field, a Coding field, an LDPC extra symbol field, and an MCS field.

The Bandwidth field indicates the bandwidth of a frequency band allocated to the second wireless communication terminal.

The STBC field indicates whether STBC is applied to data transmitted to the second wireless communication terminal.

The Group ID field identifies a group including a second wireless communication terminal that is to receive data transmitted through the corresponding frequency band. In the case of the embodiment of FIG. 24, any one of the above-described sub-frequency bands is allocated to a plurality of second wireless communication terminals. Therefore, the signaling field includes a Group ID field for identifying a group of the second wireless communication terminal instead of the field for identifying the second wireless communication terminal.

The Number of space-time streams field indicates the number of space-time streams transmitted through the frequency band allocated to the second wireless communication terminal.

The Coding field indicates whether convolution coding is applied to a signal including data to be transmitted to the second wireless communication terminal.

The LDPC extra symbol field indicates whether an extra OFDM symbol is required by applying LDPC coding to a signal including data to be transmitted to the second wireless communication terminal.

The MCS field indicates an MCS of a signal including data corresponding to the second wireless communication terminal.

As described above, the specific signaling field of the embodiment of FIG. 24 exists for each second wireless communication terminal.

Figure 25:
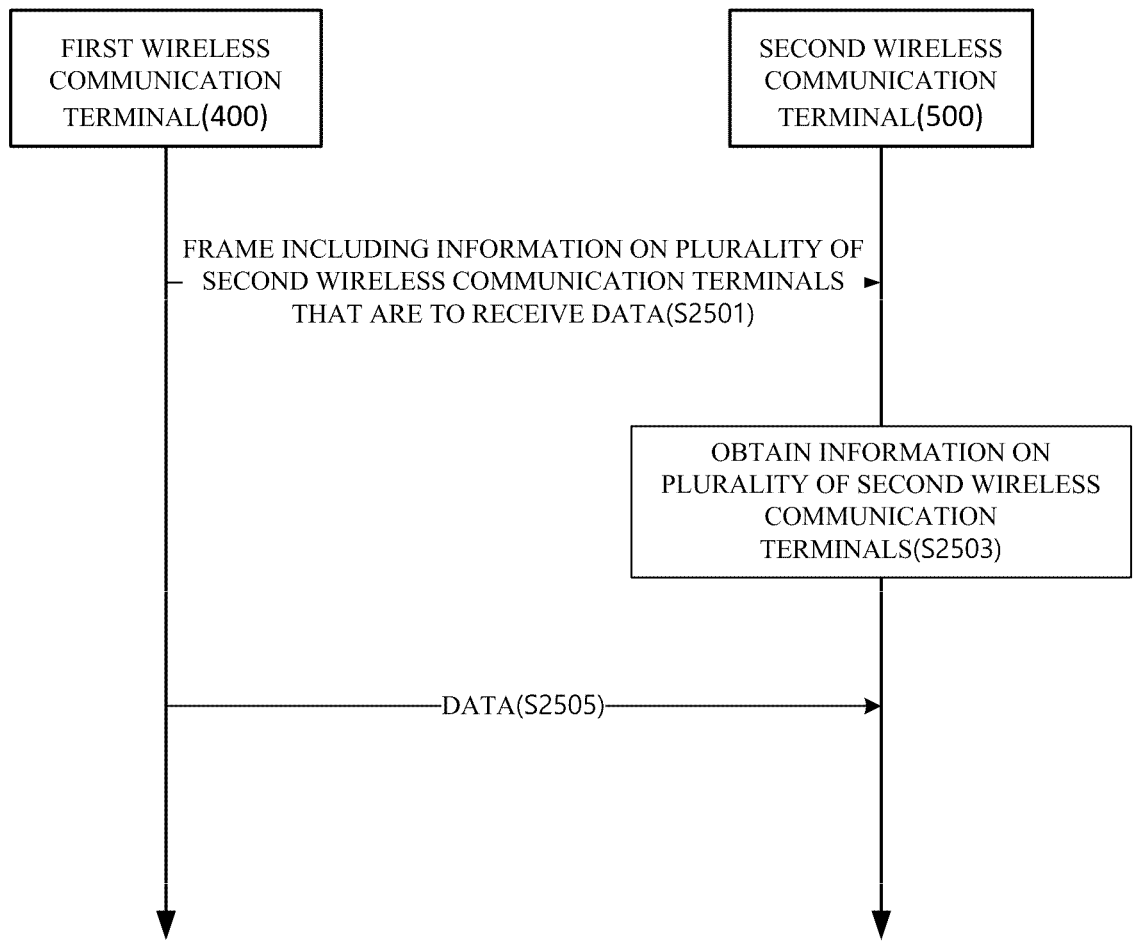
FIG. 25 is a ladder diagram illustrating operations of a first wireless communication terminal and a second wireless communication terminal according to an embodiment of the present invention.

FIG. 25 is a ladder diagram illustrating operations of a first wireless communication terminal and a second wireless communication terminal according to an embodiment of the present invention.

The first wireless communication terminal 400 transmits a frame including information on the plurality of second wireless communication terminals 500 to each of the plurality of second wireless communication terminals 500 (S2501). Specifically, the information on the plurality of second wireless communication terminals 500 may include information for identifying the plurality of second wireless communication terminals 500. Specifically, the information on the plurality of second wireless communication terminals 500 may be information for identifying each of the plurality of second wireless communication terminals 500. In addition, the information on the plurality of second wireless communication terminals 500 may be information identifying the group of the second wireless communication terminals.

In addition, the information on the plurality of second wireless communication terminals 500 may include information on a frequency band allocated to each of the plurality of second wireless communication terminals 500. The information on the plurality of second wireless communication terminals 500 may include the channel vector information described above. The channel vector information may include a channel index indicating a channel including a frequency band allocated to the second wireless communication terminal 500 and a sub-channel index indicating a sub-channel including a frequency band allocated to the second wireless communication terminal 500. At this time, the sub-channel is the sub-frequency band of a channel.

Specifically, the frame including information on the second wireless communication terminal 500 may be the above-described poll frame. In another specific embodiment, the frame including information on the second wireless communication terminal 500 may be an M-RTS frame.

The first wireless communication terminal 400 may transmit a frame for setting a NAV to each of the plurality of second wireless communication terminals 500 before transmitting a frame including information on the plurality of second wireless communication terminals 500. In another specific embodiment, the first wireless communication terminal 400 may transmit a frame for setting a NAV to each of the plurality of second wireless communication terminals 500 after transmitting a frame including information on the plurality of second wireless communication terminals 500. At this time, the frame for setting the NAV may be an RTS frame. In addition, when transmitting a frame for setting a NAV through a channel smaller than the minimum unit frequency bandwidth, the first wireless communication terminal 500 may transmit the above-described RTS-to-Self frame through a frequency band greater than the minimum unit frequency bandwidth.

The second wireless communication terminal 500 obtains information on the plurality of second wireless communication terminals 500 from the received frame (S2503). Through this, the second wireless communication terminal 500 may know to which of the second wireless communication terminals 500 the first wireless communication terminal 400 is to transmit data. Also, according to a specific embodiment, the second wireless communication terminal 500 may obtain information on the frequency band allocated to the second wireless communication terminal 500. Through this, the second wireless communication terminal 500 may receive data through the allocated frequency band. In addition, the second wireless communication terminal 500 may transmit a transmission completion frame indicating data completion to the first wireless communication terminal 400 through the allocated frequency band. At this time, the transmission completion frame may be an ACK frame.

The first wireless communication terminal 400 transmits data to each of the plurality of second wireless communication terminals 500 (S2505). The second wireless communication terminal 500 receives data from the first wireless communication terminal 400 based on the obtained information on the plurality of second wireless communication terminals 500.

The physical frame including data may include a signaling field for signaling a signal including data. In a specific embodiment, the signaling field may include information on a frequency band allocated to the second wireless communication terminal 500.

The information on the allocated frequency band may include the channel vector information described above. At this time, the channel vector information may include a channel index indicating a channel including a frequency band allocated to the second wireless communication terminal 500 and a sub-channel including the frequency band. At this time, the sub-channel is the sub-frequency band of a channel.

In addition, the information on the allocated frequency band may include at least one of information on the bandwidth of the frequency band allocated to the second wireless communication terminal 500 and Modulation & Coding Scheme (MCS) information indicating MCS of a signal including data to be transmitted to the second wireless communication terminal 500. In addition, the information on the allocated frequency band may include at least one of group identifier information for identifying a group of the second wireless communication terminals 500 including the second wireless communication terminal 500 corresponding to information signaled by the signaling field and stream number information indicating a space-time stream number transmitted through the frequency band allocated to the second wireless communication terminal 500. In addition, the information on the allocated frequency band may include at least one of space-time block coding (STBC) information indicating whether STBC is applied to a signal including data received by the second wireless communication terminal 500, convolution coding information indicating whether convolution coding is applied to a signal including data received by the second wireless communication terminal 500, and extra symbol information indicating whether an extra OFDM symbol is required by applying low-density parity-check code (LDPC) coding is applied to a signal including data received by the second wireless communication terminal 500.

The signaling field may include information on the allocated frequency band for each second wireless communication terminal 500. In a specific embodiment, the signaling field may include a plurality of fields, and each of the plurality of fields may include a plurality of fields indicating a set of information on a frequency band allocated to each of the plurality of second wireless communication terminals 500. Through this, the second wireless communication terminal 500 may decode the field indicating a set of information on a frequency band allocated to the second wireless communication terminal 500, and stop decoding the plurality of fields.

In addition, the signaling field includes a SIG-A field including information commonly applied to the plurality of second wireless communication terminals 500 and a SIG-B field including information on each of the plurality of second wireless communication terminals 500. At this time, the SIG-B field may include information on the frequency-band allocated to each of the plurality of second wireless communication terminals.

In a specific embodiment, the signaling field may follow the embodiments describing the signaling field described with reference to FIGS. 6 to 24.

In addition, the second wireless communication terminal 500 that receives data may transmit a transmission completion frame to the first wireless communication terminal 400 through various embodiments.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A base wireless communication terminal comprising:
a transceiver; and
a processor,
wherein the processor is configured to transmit, by using the transceiver, a Multiple-Request to Send (M-RTS) frame to a plurality of wireless communication terminals, wherein the M-RTS frame is a medium access control (MAC) frame and includes a plurality of channel vector fields, wherein each of the plurality of channel vector fields indicates information on an allocated sub-frequency band which is allocated to a wireless communication terminal corresponding to each of the plurality of channel vector fields among the plurality of wireless communication terminals, wherein the allocated sub-frequency band is allocated for communication between the base wireless communication terminal and at least one of the plurality of wireless communication terminals after a transmission of the M-RTS frame, and
receive a Clear to Send (CTS) frame which is a response to the M-RTS frame from the at least one of the plurality of wireless communication terminals,
wherein bits of each of the plurality of channel vector fields are divided into a first one or more bits indicating a location of a channel, among a plurality of channels, which includes the allocated sub-frequency band, and a second one or more bits indicating a location and a size of a sub-channel corresponding to the allocated sub-frequency band within the channel, and
wherein the sub-channel is included in the channel.

2. The base wireless communication terminal of claim 1, wherein the M-RTS frame includes a plurality of identifiers for identifying each of the plurality of wireless communication terminals.

3. The base wireless communication terminal of claim 1, wherein the first one or more bits indicate index of the channel and the second one or more bits indicate the index of the sub-channel.

4. The base wireless communication terminal of claim 1, wherein the processor is configured to transmit data frames to the plurality of wireless communication terminal when a predetermined time elapses after receiving the CTS frame.

5. The base wireless communication terminal of claim 1, wherein the processor is configured to transmit the M-RTS frame through a frequency band including the primary channel having the minimum unit bandwidth.

6. A wireless communication terminal comprising:
a transceiver; and
a processor,
wherein the processor is configured to receive, by using the transceiver, a M-RTS (Multiple-Request to Send) frame from the base wireless communication terminal, wherein the M-RTS frame is a medium access control (MAC) frame and includes a plurality of channel vector fields, wherein each of the plurality of channel vector fields indicates information on an allocated sub-frequency band which is allocated to a wireless communication terminal corresponding to each of the plurality of channel vector fields among the plurality of wireless communication terminals, wherein the allocated sub-frequency band allocated for communication between the base wireless communication terminal and at least one of the plurality of wireless communication terminals after a transmission of the M-RTS frame, and
transmit a Clear to Send (CTS) frame which is a response to the M-RTS frame to the base wireless communication terminal,
wherein bits of each of the plurality of channel vector fields are divided into a first one or more bits indicating a location of a channel, among a plurality of channels, which includes the allocated sub-frequency band, and a second one or more bits indicating a location and a size of a sub-channel corresponding to the allocated sub-frequency band within the channel, and
wherein the sub-channel is included in the channel.

7. The wireless communication terminal of claim 6, wherein the M-RTS frame includes a plurality of identifiers for identifying each of the plurality of wireless communication terminals.

8. The wireless communication terminal of claim 6, wherein the first one or more bits indicate index of the channel and the second one or more bits indicate the index of the sub-channel.

9. The wireless communication terminal of claim 6, wherein the processor is configured to receive a data frame from the base wireless communication terminal after transmitting the CTS frame.

10. The wireless communication terminal of claim 6, wherein the processor is configured to receive the M-RTS frame through a frequency band including the primary channel having the minimum unit bandwidth.

11. An operation method of a wireless communication terminal comprising:
receiving a Multiple-Request to Send (M-RTS) frame from the base wireless communication terminal, wherein the M-RTS frame is a medium access control (MAC) frame and includes a plurality of channel vector fields, wherein each of the plurality of channel vector fields indicates information on an allocated sub-frequency band which is allocated to a wireless communication terminal corresponding to each of the plurality of channel vector fields among the plurality of wireless communication terminals, wherein the allocated sub-frequency band is for communication between the base wireless communication terminal and at least one of the plurality of wireless communication terminals after a transmission of the M-RTS frame; and
transmitting a Clear to Send (CTS) frame which is a response to the M-RTS frame to the base wireless communication terminals,
wherein bits of each of the plurality of channel vector fields are divided into a first one or more bits indicating a location of a channel, among a plurality of channels, which includes the allocated sub-frequency band, and a second one or more bits indicating a location and a size of a sub-channel corresponding to the allocated frequency band within the channel, and wherein the sub-channel is included in the channel.

12. The operation method of claim 11, wherein the M-RTS frame includes a plurality of identifiers for identifying each of the plurality of wireless communication terminals.

13. The operation method of claim 11, wherein the first one or more bits indicate index of the channel and the second one or more bits indicate the index of the sub-channel.

14. The operation method of claim 11, further comprising receiving a data frame from the base wireless communication terminal after transmitting the CTS frame.

15. The operation method of claim 11, further comprising receiving the M-RTS frame through a frequency band including the primary channel having the minimum unit bandwidth.

* * * * *